United States Patent
Imbruce et al.

(10) Patent No.: US 10,394,877 B2
(45) Date of Patent: Aug. 27, 2019

(54) METHOD AND SYSTEM FOR STORYTELLING ON A COMPUTING DEVICE VIA SOCIAL MEDIA

(71) Applicant: OATH INC., New York, NY (US)

(72) Inventors: Doug Imbruce, New York, NY (US); Gregory Pape, New York, NY (US); Gustav Johan Rasmus Knutsson, Brooklyn, NY (US)

(73) Assignee: OATH INC., New York, NY (US)

( * ) Notice: Subject to any disclaimer, the term of this patent is extended or adjusted under 35 U.S.C. 154(b) by 473 days.

(21) Appl. No.: 14/134,976

(22) Filed: Dec. 19, 2013

(65) Prior Publication Data

US 2014/0172863 A1    Jun. 19, 2014

Related U.S. Application Data

(60) Provisional application No. 61/739,669, filed on Dec. 19, 2012, provisional application No. 61/739,698, (Continued)

(51) Int. Cl.
*G06F 16/00* (2019.01)
*G06F 16/40* (2019.01)
(Continued)

(52) U.S. Cl.
CPC ............ *G06F 16/40* (2019.01); *G06F 16/285* (2019.01); *G06F 16/35* (2019.01); *G06F 16/4393* (2019.01); *G06F 17/212* (2013.01)

(58) Field of Classification Search
CPC ........ G06F 16/40; G06F 16/35; G06F 16/285; G06F 17/212; G06F 16/4393
See application file for complete search history.

(56) References Cited

U.S. PATENT DOCUMENTS

| | | | |
|---|---|---|---|
| 7,836,110 B1 | 11/2010 | Schoenbach et al. | |
| 2008/0215984 A1* | 9/2008 | Manico | G06F 17/30035 715/730 |
| 2011/0060756 A1 | 3/2011 | Schoenbach et al. | |
| 2011/0060994 A1* | 3/2011 | Maxwell | G06F 3/147 715/730 |
| 2011/0069085 A1* | 3/2011 | Weber | G06T 11/60 345/620 |

OTHER PUBLICATIONS

"Auto Awesome Movie" on Google+; http://www.youtube.com/watch?v=Rv1tZm1sHQl&feature=youtu.be; Published on Oct. 29, 2013; 3 pages.

(Continued)

Primary Examiner — Paul Kim
(74) Attorney, Agent, or Firm — James J. DeCarlo; Greenberg Traurig, LLP

(57) ABSTRACT

Disclosed is a method and system for enabling storytelling on a computing device. A processor: (a) analyzes a first set of media items associated with the user, each media item having associated metadata; (b) identifies one or more related characteristics among the media items in the first set; (c) forms a cluster of media items associated with an event based on the identified one or more related characteristics; (d) repeats steps (a) and (b) for a second set of media items, each media item in the second set having associated metadata and related to a social connection of the user; (e) adds media items in the second set, from a social media site associated with the second set, to the cluster; (f) edits selected media items in the cluster to fit into selected templates; and (g) creates a mixed-media module comprising the templates organized into a desired sequence.

21 Claims, 21 Drawing Sheets

Related U.S. Application Data filed on Dec. 19, 2012, provisional application No. 61/798,000, filed on Dec. 19, 2012, provisional application No. 61/740,347, filed on Dec. 20, 2012, provisional application No. 61/740,280, filed on Dec. 20, 2012, provisional application No. 61/740,416, filed on Dec. 20, 2012, provisional application No. 61/761,675, filed on Feb. 6, 2013, provisional application No. 61/815,724, filed on Apr. 24, 2013, provisional application No. 61/821,216, filed on May 8, 2013.

(51) Int. Cl.
*G06F 16/35* (2019.01)
*G06F 16/28* (2019.01)
*G06F 17/21* (2006.01)
*G06F 16/438* (2019.01)

OTHER PUBLICATIONS

MixBit, About the MixBot poduct; 2013 AVOS Systems, Inc., 2 pgs. <<https://mixbit.com.>> Retrieved on Aug. 8, 2013.

Mangalindan, "YouTube founders try for theft next big thing"; posted Aug. 8, 2013, Fortune Tech, CNN Money; 2 pgs. <<http://tech.fortune.cnn.com/2013/08/08/youtube-founders-try-for-their-next-big-thing?iid=. . . >> Retrieved on Aug. 8, 2013.

Brian, "Google to unveil Auto Awesome feature that creates stories from your videos", posted Oct. 29, 2013, 2 pgs. <<http://www.engadget.com/2013/10/29/google-unveiling-auto-awesome-mov . . . >> Retrieved on Nov. 4, 2013.

Haselton, "Google Intros Auto Awesome Movie for Highlight Clips on Android", posted Oct. 29, 2013, 2 pgs. <<http://www.technobuffalo.com/2013/10/29/google-intors-auto-awesome-mo . . . >> Retrieved on Nov. 4, 2013.

\* cited by examiner

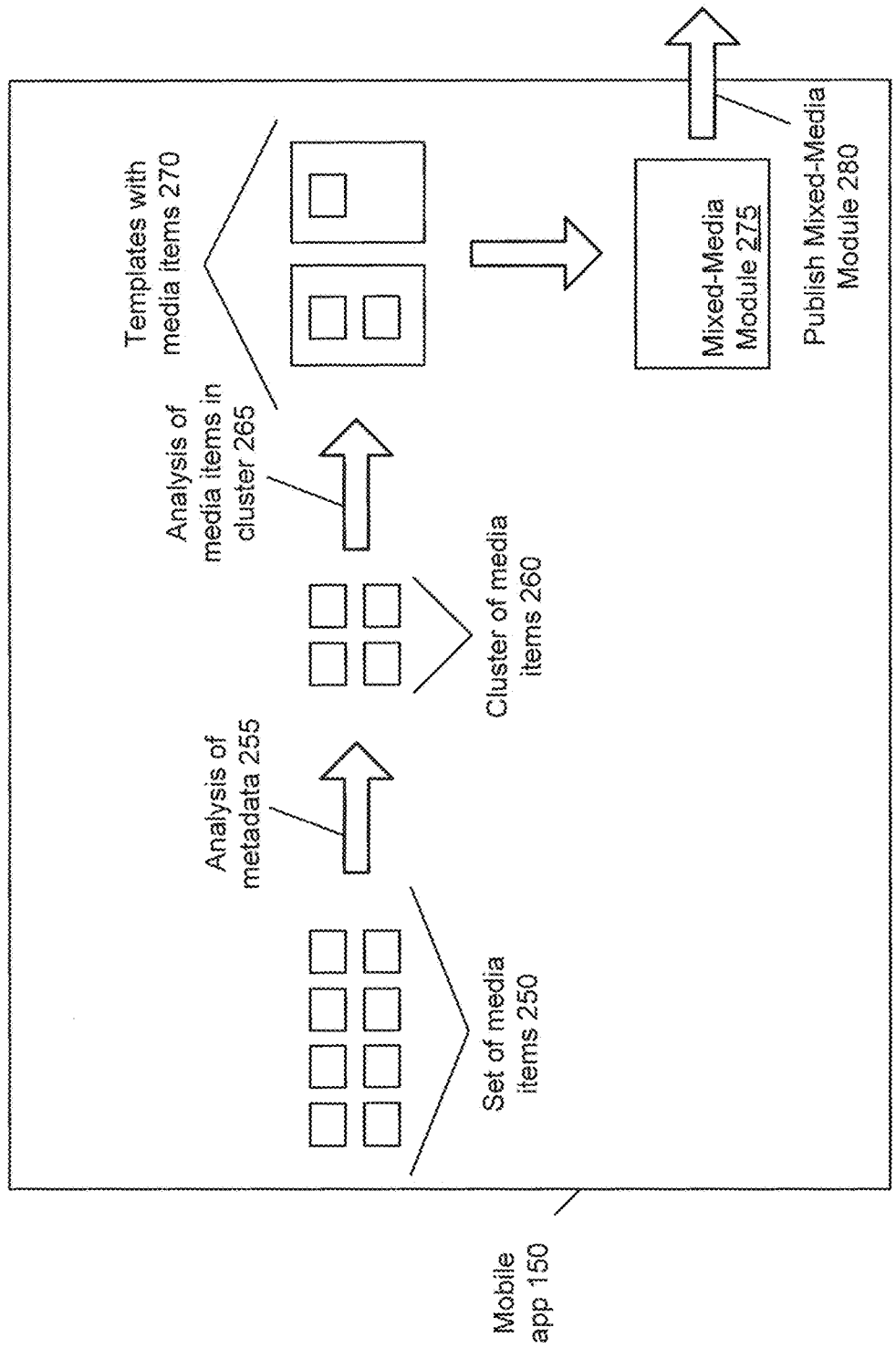

– Story Rank

900

StoryRankAlgorithmSummary 905

Speed (1=Slow; 2=Med; 3=Fast)    1    <= select case

| | Case: Slow | | | | Seconds by Media Type & Scenarios | | | |
|---|---|---|---|---|---|---|---|---|
| | # Media | Sec / Ele | Sec / Media Type | | | 1 | 2 | 3 |
| | | | | | | Slow | Medium | Fast |
| Portrait | 10 | 2.00 | 20.00 | | Portrait | 2.00 | 1.00 | 0.75 |
| Landscape | 5 | 3.00 | 15.00 | | Landscape | 3.00 | 2.00 | 1.00 |
| Videos | 2 | 6.50 | 13.00 | | Videos | 6.50 | 6.00 | 5.50 |
| Total | 17 | | 48.00 | | | | | |

Divider (Seconds / 30)    1.6
Total Grids    10.6

Time Allocation Worksheet 910

| | Portrait 915 | | | | Landscape 920 | | | | Videos 925 | | |
|---|---|---|---|---|---|---|---|---|---|---|---|
| ID the Row | Slow | Medium | Fast | ID the Row | Slow | Medium | Fast | ID the Row | Slow | Medium | Fast |
| 0 | 5.00 | 4.00 | 3.00 | 0 | 6.00 | 5.00 | 4.00 | 0 | 8.00 | 7.50 | 7.00 |
| 0 | 4.00 | 3.00 | 2.00 | 0 | 5.00 | 4.00 | 3.00 | 0 | 7.50 | 7.00 | 6.50 |
| 0 | 3.00 | 2.00 | 1.00 | 0 | 4.00 | 3.00 | 2.00 | 0 | 7.00 | 6.50 | 6.00 |
| 17 | 2.00 | 1.00 | 0.75 | 17 | 3.00 | 2.00 | 1.00 | 17 | 6.50 | 6.00 | 5.50 |
| 0 | 1.00 | 0.75 | 0.50 | 0 | 2.00 | 1.00 | 0.75 | 0 | 6.00 | 5.50 | 5.00 |

| Max Media | Differential |
|---|---|
| 9 | -8 |
| 12 | -5 |
| 15 | -2 |
| 20 | 3 |
| 24 | 7 |

| Max Media |
|---|
| 9 |
| 12 |
| 15 |
| 20 |
| 24 |

Fig. 9

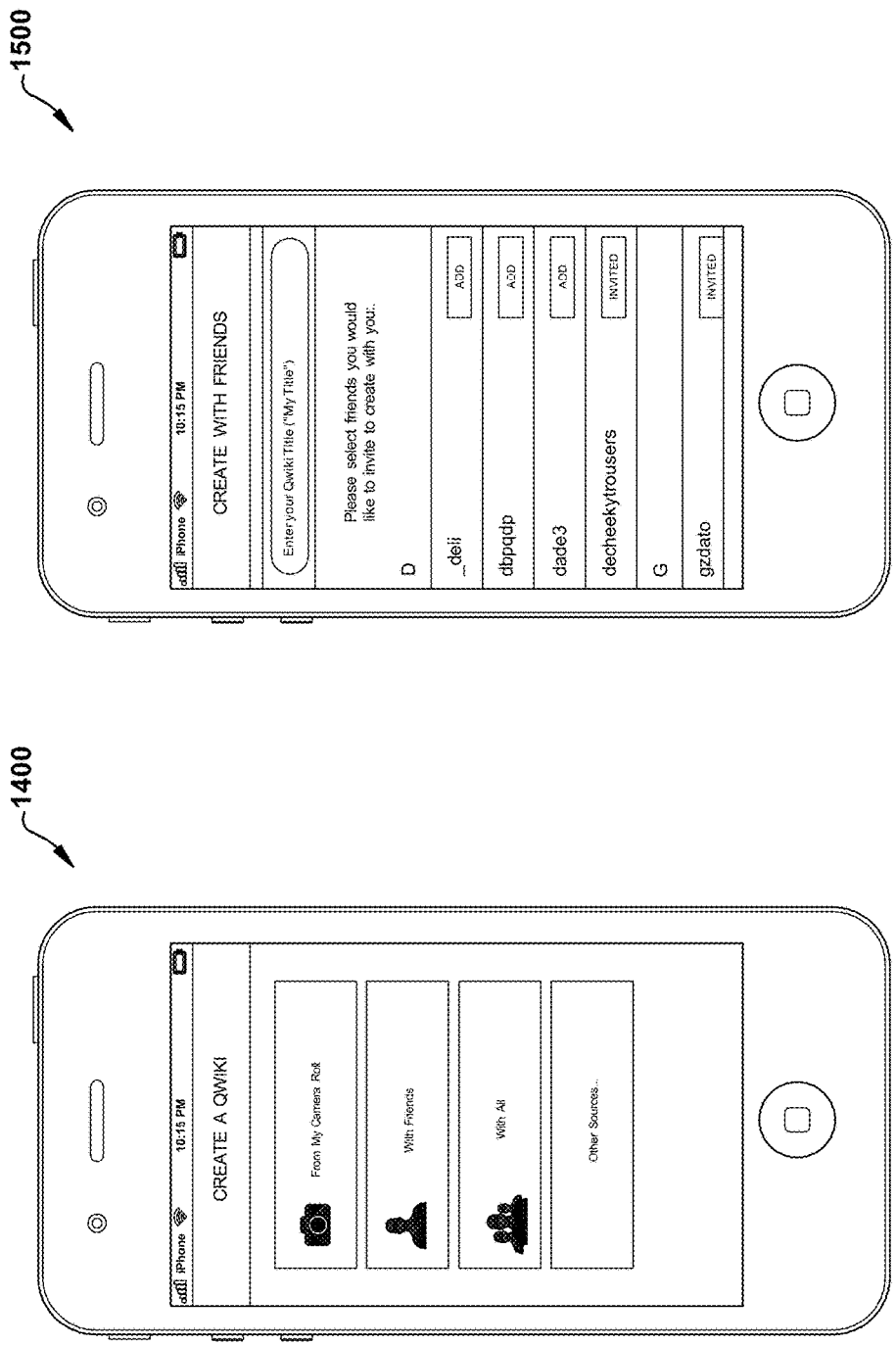

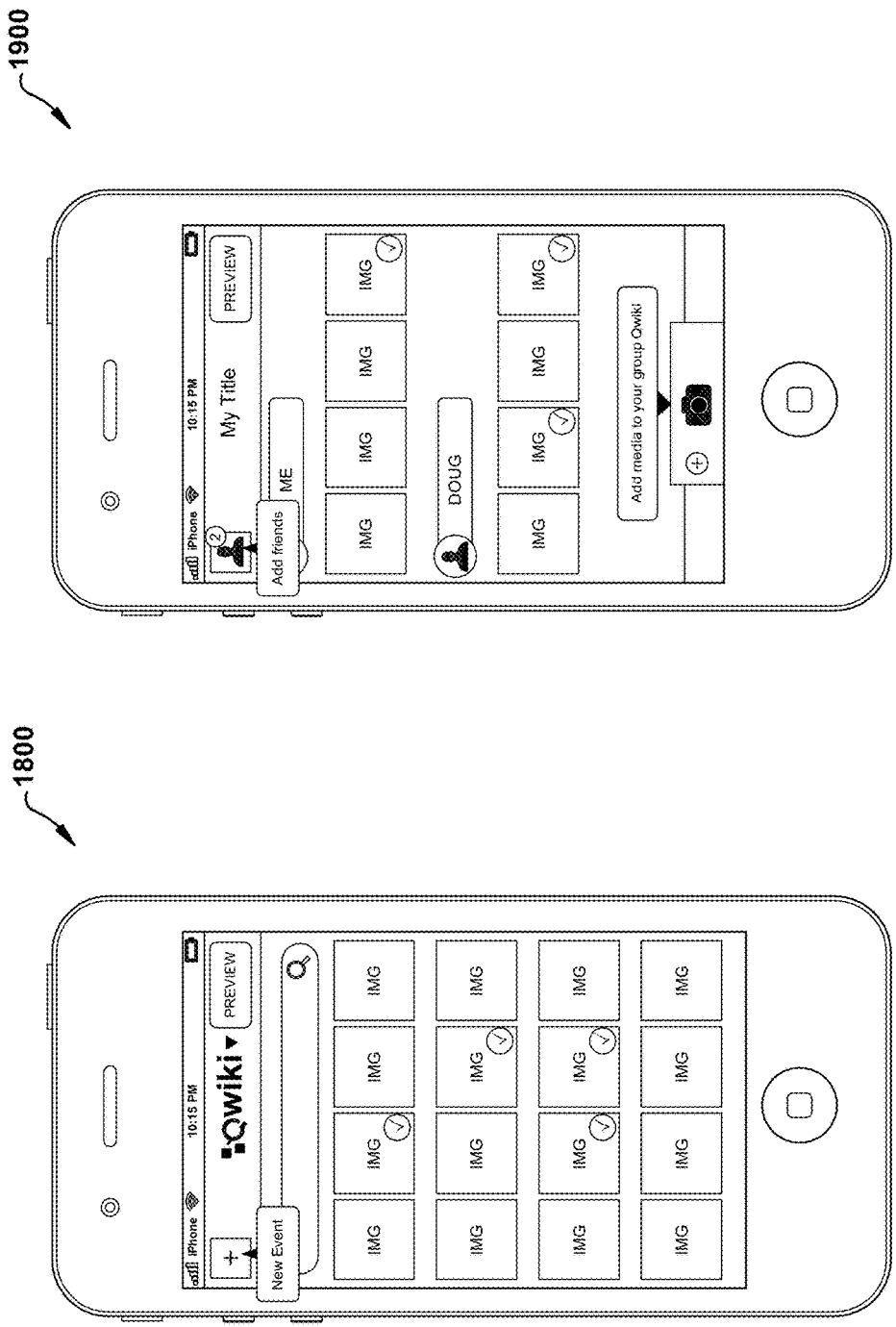

METHOD AND SYSTEM FOR STORYTELLING ON A COMPUTING DEVICE VIA SOCIAL MEDIA

CROSS REFERENCE TO RELATED APPLICATIONS

This patent application claims the benefit of Provisional Patent Application Ser. No. 61/739,669, titled "Systems and Methods Involving Information Modules Including Auto-Publishing, Mobile Device and/or Other Features" filed on Dec. 19, 2012; Provisional Patent Application Ser. No. 61/739,698, titled "Systems and Methods Involving Information Modules Including Metadata/Meta signal/Shared Media Processing, Auto-Publishing, Mobile Device, Full Stack and/or Other Features" filed on Dec. 19, 2012; Provisional Patent Application Ser. No. 61/798,000, titled "Systems and Methods Involving Information Modules Including Metadata/Meta signal Processing, Auto-Publishing, Mobile Device and/or Other Features" filed on Dec. 19, 2012; Provisional Patent Application Ser. No. 61/740,347, titled "Systems and Methods Involving Information Modules Including Metadata/Meta signal Processing, Auto-Publishing, Mobile Device and/or Other Features" filed on Dec. 20, 2012; Provisional Patent Application Ser. No. 61/740,280, titled "Systems and Methods Involving Information Modules Including Metadata/Meta signal Processing, Auto-Publishing, Mobile Device and/or Other Features" filed on Dec. 20, 2012; Provisional Patent Application Ser. No. 61/740,416, titled "Systems and Methods Involving Information Modules Including Metadata/Meta signal/Shared Media Processing, Auto-Publishing, Mobile Device, Full Stack and/or Other Features" filed on Dec. 20, 2012; Provisional Patent Application Ser. No. 61/761,675, titled "Systems and Methods of Capturing Metadata and Meta-Signals of Recorded Media on Mobile Devices and Auto-Publishing Event-Based Media Into a Synchronized, Editable Multimedia Story with One Tap Storytelling" filed on Feb. 6, 2013; Provisional Patent Application Ser. No. 61/815,724, titled "Systems and Methods Involving Information Modules Including Layout, Capture, Camera, Display and/or Other Features" filed on Apr. 24, 2013, and Provisional Patent Application Ser. No. 61/821,216, titled "Systems and Methods Involving Information Modules Including Smart Scrolling, Layout, Capture, Camera, Display and/or Other Features" filed on May 8, 2013, all of which are incorporated herein by reference.

FIELD

The present disclosure relates to enabling storytelling on a mobile computing device, and more specifically to creating and displaying a mixed-media module representing a story on a mobile computing device.

BACKGROUND

Current methods for cataloging and viewing multimedia stored on a mobile device is limited. The arrangement of the media items into any kind of logical sequence or presentation requires manual intervention and analysis of the individual files. Present solutions involve a variety of drawbacks, such as being too time intensive, and/or requiring excessive or complex editing, among others. Further, as the user manually arranges different media items into a sequence, the user often loses sight of the high level theme that the user initially wanted to portray in the sequence.

SUMMARY

A method and system for enabling storytelling on a computing device are disclosed. In one aspect, a method, system, and computer readable storage medium for storytelling on a computing device operated by a user include the following: (a) analyzing, by a processor of the computing device, a first set of media items associated with the user, each media item having associated metadata; (b) identifying, by the processor, based on analysis of the associated metadata in the first set, one or more related characteristics among the media items in the first set; (c) forming, by the processor, a cluster of media items associated with an event based on the identified one or more related characteristics; (d) repeating, by the processor, steps (a) and (b) for a second set of media items, each media item in the second set having associated metadata and related to a social connection of the user; (e) adding, by the processor and based on the identifying, one or more media items in the second set having the one or more related characteristics, from a social media site associated with the second set, to the cluster of media items; (f) editing, by the processor, selected media items in the cluster to fit into selected templates, each template configured to represent a moment in the event; and (g) creating, by the processor, a mixed-media module comprising the plurality of templates organized into a desired sequence for the selected templates.

In one embodiment, the processor analyzes the associated metadata of each media item in the first set. The processor can analyze the associated metadata of each media item in the second set. The processor can analyze the media items in the cluster. In one embodiment, the processor selects, based on the analysis of the media items in the cluster, a plurality of templates from a template database. The processor can determine the desired sequence for the selected templates. In one embodiment, the social connection includes one or more of a friend, follower, contact, and connection in the social media site. In one embodiment, the processor shares the mixed-media module with a second social connection on the social media site. The processor may communicate a notification to a second computing device, where the notification relates to the mixed-media module. The creating can include enabling the user and a social media site social connection of the user to create the mixed-media module.

In one aspect, a method for and a server computer includes logic for communicating a software application to a computing device operated by a user, where the software application is configured to perform steps (a)-(g).

In another aspect, a method, system, and computer readable storage medium for storytelling on a computing device operated by a user includes the following steps performed by a processor of the computing device. The processor analyzes a set of media items associated with the user, where each media item has associated metadata. The processor identifies, based on analysis of the associated metadata, one or more related characteristics among the media items in the set to form a cluster of media items associated with an event. The processor selects, based on analysis of the media items in the cluster, a plurality of templates from a template database, where each template is configured to represent a moment in the event. The processor edits selected media items in the cluster to fit into the selected templates. The processor creates a mixed-media module including the plurality of templates organized into a desired sequence for the selected templates.

In another aspect, a method, system, and computer readable storage medium for storytelling on a computing device operated by a user include the following: (a) analyzing, by a processor of the computing device, a first set of media items associated with the user, where each media item has associated metadata; (b) identifying, by the processor, based on analysis of the associated metadata in the first set, one or more related characteristics among the media items in the first set; (c) forming, by the processor, a cluster of media items associated with an event based on the identified one or more related characteristics; (d) repeating, by the processor, steps (a) and (b) for a second set of media items associated with the user; (e) adding, by the processor, one or more media items in the second set having the one or more related characteristics, from a computing device associated with the second set, to the cluster of media items; (f) editing, by the processor, selected media items in the cluster to fit into selected templates, each template configured to represent a moment in the event; and (g) creating, by the processor, a mixed-media module comprising the plurality of templates organized into a desired sequence for the selected templates.

In another aspect, a method, system, and computer readable storage medium for storytelling on a computing device operated by a user include the following steps performed by a processor of the computing device. The processor analyzes a set of media items associated with the user, each media item having associated metadata. The processor identifies, based on analysis of the associated metadata, one or more related characteristics among the media items in the set to form a cluster of media items associated with an event associated with the user. The processor selects, based on analysis of the media items in the cluster, a plurality of templates from a template database, each template of the plurality of templates configured to represent a moment in the event. The processor edits selected media items in the cluster to fit into the selected templates. The processor creates a mixed-media module comprising the plurality of templates organized into a desired sequence for the selected templates. The processor displays, to the user, a preview of the mixed-media module, receives edit commands from the user for editing the mixed-media module, and applies the edit commands to the mixed-media module to create a final mixed-media module. The processor then displays the final mixed-media module.

In another aspect, a method, system, and computer readable storage medium for storytelling on a computing device operated by a user include the following steps performed by a processor of the computing device. The processor analyzes a set of media items associated with the user, each media item having associated metadata. The processor identifies, based on analysis of the associated metadata, one or more related characteristics among the media items in the set to form a cluster of media items associated with an event associated with the user. The processor selects, based on analysis of the media items in the cluster, a plurality of templates from a template database, each template of the plurality of templates configured to represent a moment in the event. The processor edits selected media items in the cluster to fit into the selected templates. The processor scores each selected template based on the metadata associated with the selected media items in the selected template. The processor creates a mixed-media module of predetermined duration comprising the plurality of templates organized into a desired sequence for the selected templates.

These and other aspects and embodiments will be apparent to those of ordinary skill in the art by reference to the following detailed description and the accompanying drawings.

BRIEF DESCRIPTION OF THE DRAWINGS

In the drawing figures, which are not to scale, and where like reference numerals indicate like elements throughout the several views:

FIG. 2B is a block diagram illustrating the flow of the operations of the mobile app to create a mixed-media module in accordance with an embodiment of the present disclosure;

FIG. 9 is a chart diagram showing story rank in accordance with an embodiment of the present disclosure;

FIG. 14 shows a create screenshot of the mobile app in accordance with an embodiment of the present disclosure;

FIG. 15 shows an invite screenshot of the mobile app in accordance with an embodiment of the present disclosure;

FIG. 18 shows an event creation screenshot of the mobile app in accordance with an embodiment of the present disclosure;

FIG. 19 shows a collaborative event creation screenshot of the mobile app in accordance with an embodiment of the present disclosure.

DESCRIPTION OF EMBODIMENTS

Figure 1:
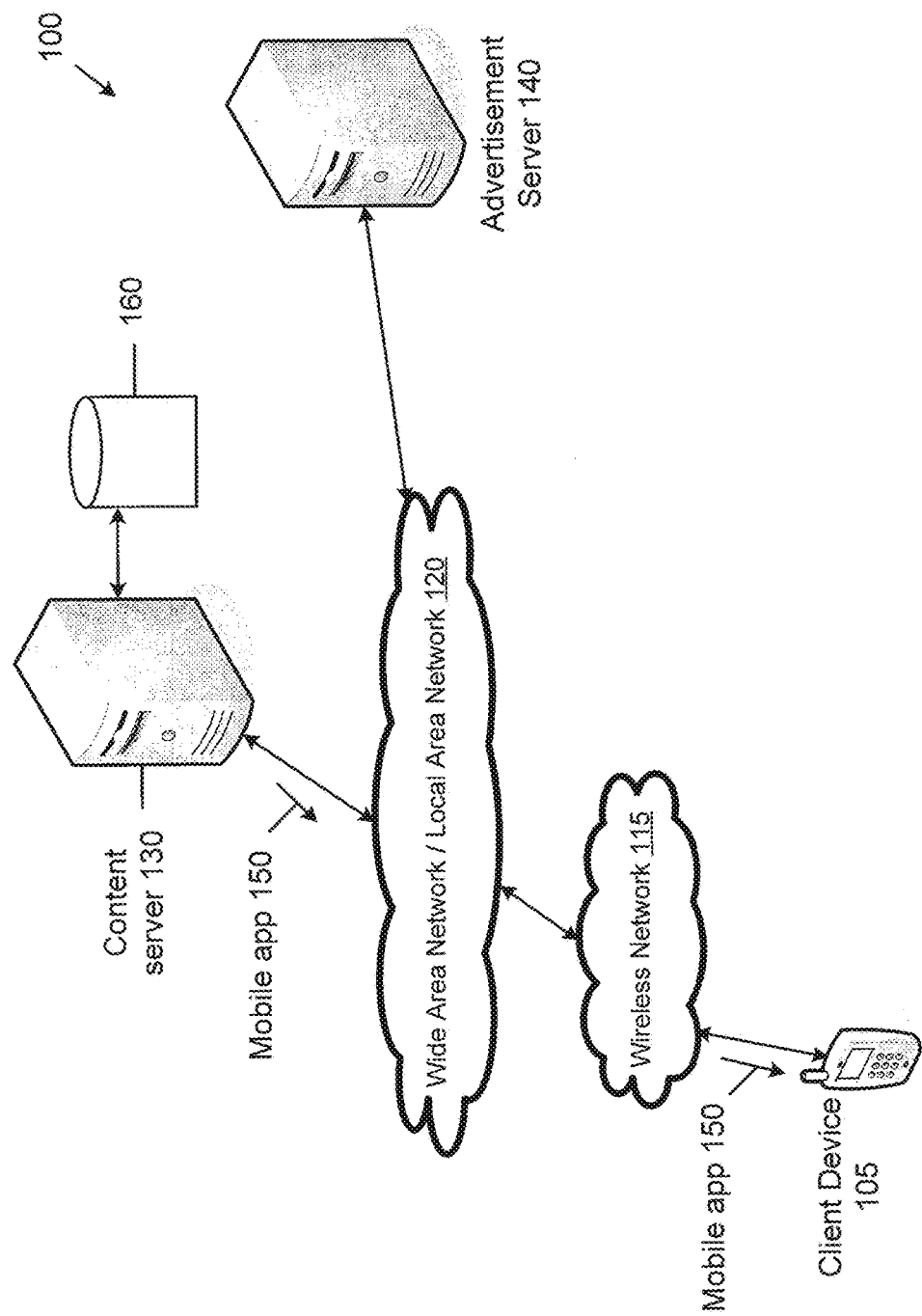
FIG. 1 is a block diagram of a client device communicating with a server computer over a network in accordance with an embodiment of the present disclosure.

Embodiments are now discussed in more detail referring to the drawings that accompany the present application. In the accompanying drawings, like and/or corresponding elements are referred to by like reference numbers.

Various embodiments are disclosed herein; however, it is to be understood that the disclosed embodiments are merely illustrative of the disclosure that can be embodied in various forms. In addition, each of the examples given in connection with the various embodiments is intended to be illustrative, and not restrictive. Further, the figures are not necessarily to scale, some features may be exaggerated to show details of particular components (and any size, material and similar details shown in the figures are intended to be illustrative and not restrictive). Therefore, specific structural and functional details disclosed herein are not to be interpreted as limiting, but merely as a representative basis for teaching one skilled in the art to variously employ the disclosed embodiments.

The present invention is described below with reference to block diagrams and operational illustrations of methods and devices to select and present media related to a specific topic. It is understood that each block of the block diagrams or operational illustrations, and combinations of blocks in the block diagrams or operational illustrations, can be implemented by means of analog or digital hardware and computer program instructions. These computer program instructions can be provided to a processor of a general purpose computer, special purpose computer, ASIC, or other programmable data processing apparatus, such that the instructions, which execute via the processor of the computer or other programmable data processing apparatus, implements the functions/acts specified in the block diagrams or operational block or blocks.

In some alternate implementations, the functions/acts noted in the blocks can occur out of the order noted in the operational illustrations. For example, two blocks shown in succession can in fact be executed substantially concurrently or the blocks can sometimes be executed in the reverse order, depending upon the functionality/acts involved. Furthermore, the embodiments of methods presented and described as flowcharts in this disclosure are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

FIG. 1 is a schematic diagram illustrating an example system 100 of a network and devices implementing embodiments of the present disclosure. Other embodiments that may vary, for example, in terms of arrangement or in terms of type of components, are also intended to be included within claimed subject matter. FIG. 1 includes, for example, a client device 105 (also referred to herein as mobile computing device 105 or mobile device 105) in communication with a content server 130 over a wireless network 115 connected to a local area network (LAN)/wide area network (WAN) 120, such as the Internet. Content server 130 is also referred to below as server computer 130 or server 130. In one embodiment, the client device 105 is also in communication with an advertisement server 140, which may provide one or more advertisements to the client device 105. Although shown as a wireless network 115 and WAN/LAN 120, the client device 105 can communicate with servers 130, 140 via any type of network.

A computing device may be capable of sending or receiving signals, such as via a wired or wireless network, or may be capable of processing or storing signals, such as in memory as physical memory states, and may, therefore, operate as a server. Thus, devices capable of operating as a server may include, as examples, dedicated rack-mounted servers, desktop computers, laptop computers, set top boxes, integrated devices combining various features, such as two or more features of the foregoing devices, or the like. Servers may vary widely in configuration or capabilities, but generally a server may include one or more central processing units and memory. A server may also include one or more mass storage devices, one or more power supplies, one or more wired or wireless network interfaces, one or more input/output interfaces, or one or more operating systems, such as Windows Server, Mac OS X, Unix, Linux, FreeBSD, or the like.

Examples of devices that may operate as a content server include desktop computers, multiprocessor systems, microprocessor-type or programmable consumer electronics, etc. Content server 130 may provide a variety of services that include, but are not limited to, web services, third-party services, audio services, video services, email services, instant messaging (IM) services, SMS services, MMS services, FTP services, voice over IP (VOIP) services, calendaring services, photo services, social media services, or the like. Examples of content may include text, images, audio, video, or the like, which may be processed in the form of physical signals, such as electrical signals, for example, or may be stored in memory, as physical states, for example. In one embodiment, the content server 130 hosts or is in communication with a database 160.

A network may couple devices so that communications may be exchanged, such as between a server and a client device or other types of devices, including between wireless devices coupled via a wireless network, for example. A network may also include mass storage, such as network attached storage (NAS), a storage area network (SAN), or other forms of computer or machine readable media, for example. A network may include the Internet, one or more local area networks (LANs), one or more wide area networks (WANs), wire-line type connections, wireless type connections, or any combination thereof. Likewise, sub-networks, such as may employ differing architectures or may be compliant or compatible with differing protocols, may interoperate within a larger network. Various types of devices may, for example, be made available to provide an interoperable capability for differing architectures or protocols. As one illustrative example, a router may provide a link between otherwise separate and independent LANs.

A communication link or channel may include, for example, analog telephone lines, such as a twisted wire pair, a coaxial cable, full or fractional digital lines including T1, T2, T3, or T4 type lines, Integrated Services Digital Networks (ISDNs), Digital Subscriber Lines (DSLs), wireless links including satellite links, or other communication links or channels, such as may be known to those skilled in the art. Furthermore, a computing device or other related electronic devices may be remotely coupled to a network, such as via a telephone line or link, for example.

A wireless network may couple client devices with a network. A wireless network may employ stand-alone ad-hoc networks, mesh networks, Wireless LAN (WLAN) networks, cellular networks, or the like. A wireless network may further include a system of terminals, gateways, routers, or the like coupled by wireless radio links, or the like, which may move freely, randomly or organize themselves arbitrarily, such that network topology may change, at times even rapidly. A wireless network may further employ a plurality of network access technologies, including Long Term Evolution (LTE), WLAN, Wireless Router (WR) mesh, or 2nd, 3rd, or 4th generation (2G, 3G, or 4G) cellular technology, or the like. Network access technologies may enable wide area coverage for devices, such as client devices with varying degrees of mobility, for example.

For example, a network may enable RF or wireless type communication via one or more network access technologies, such as Global System for Mobile communication (GSM), Universal Mobile Telecommunications System (UMTS), General Packet Radio Services (GPRS), Enhanced Data GSM Environment (EDGE), 3GPP Long Term Evolution (LTE), LTE Advanced, Wideband Code Division Multiple Access (WCDMA), Bluetooth. 802.11b/g/n, or the like. A wireless network may include virtually any type of wireless communication mechanism by which signals may be communicated between devices, such as a client device or a computing device, between or within a network, or the like.

In one embodiment and as described herein, the client device 105 is a mobile computing device such as a smart-phone. In another embodiment, the client device 105 is a tablet, laptop, wearable computing device (e.g., a watch, clothing, sensor, band, glasses (e.g., Google® Glass), or any other computing device. Although described herein with an embodiment of a mobile computing device, it should be noted that the present disclosure is not limited to mobile devices or applications.

The server computer 130 (or other network-available resource) transmits a mobile software application (or "app") 150 to the client device 105. In one embodiment, the client device 105 downloads the mobile app 150 (e.g., from an app store or from a web page). In one embodiment, the server computer 130 transmits the mobile app 150 to the client device 105. In one embodiment, the client device 105 includes the mobile app 150 as part of (e.g., pre-installed) software resident on the client device 105.

Figure 2A:
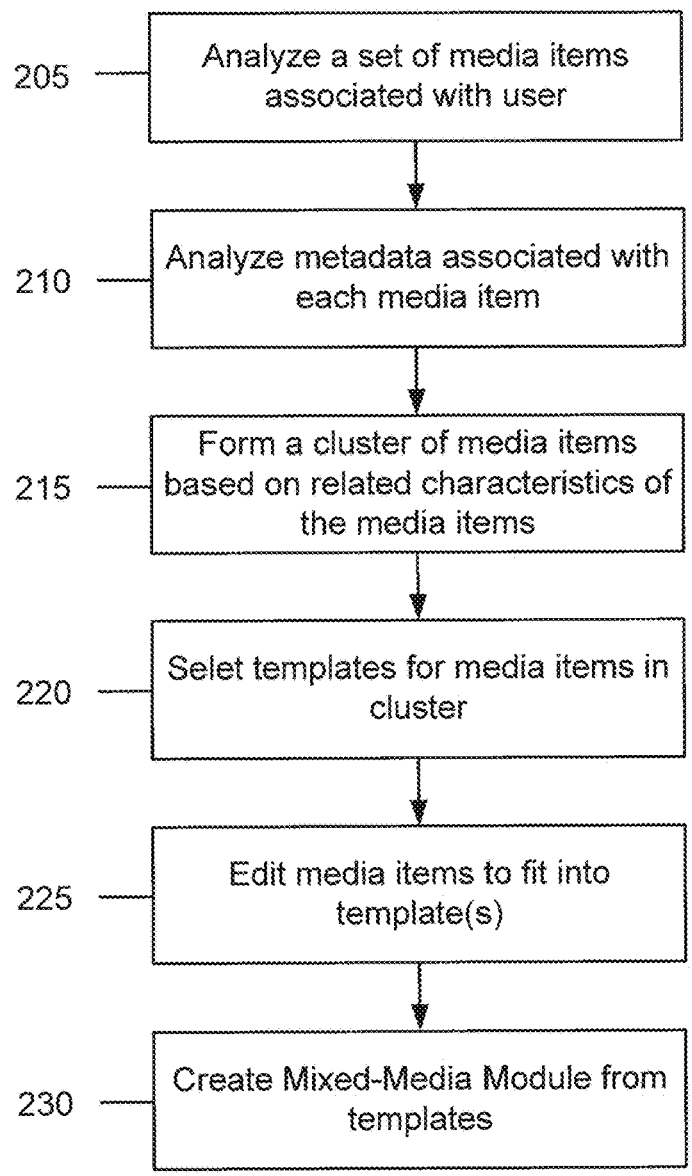
FIG. 2A is a flowchart illustrating steps performed by the client device when executing a mobile app to perform one tap storytelling in accordance with an embodiment of the present disclosure.

The client device 105 then executes the mobile app 150. Also referring to FIGS. 2A and 2B, in one embodiment the mobile app 150 analyzes a set of media items 250 associated with the user, where each media item has associated metadata (Step 205). Examples of the metadata can include context, time stamp or time frame, location (e.g., geo-location), tags, music or song(s) played before, during, or after the media item, and/or any other information associated with the media item. The processor analyzes the associated metadata (shown with arrow 255 in FIG. 2B) of each media item in the set 250 (Step 210). In one embodiment, the mobile app 150 identifies, based on the analysis, one or more related characteristics among the media items in the set to form a cluster 260 of media items associated with an "event", such as, for example, a soccer game, concert, or party (Step 215). The related characteristics can be, for example, that two or more media items were captured within a given time period (e.g., two digital photographs were taken within one day or one hour of each other), two or more media items were captured at the same or close to the same location (geo-location), two or more media items have the same or similar tags associated with the media items, the same people are present in the media item, or any other related characteristics between two or more media items in the set.

As described in more detail below, a "moment" is defined as a plurality of media items grouped together and representing a portion of a story that is meaningful to the user and/or to the overall context of the story to be created.

The mobile app 150 analyzes the media items in the cluster 260 (shown with arrow 265 in FIG. 2B) and selects, based on this analysis, templates 270 from a template database (Step 220). In one embodiment, the templates are selected by the mobile app 150 based on, for example, the layout or timing (or any other characteristic) of the media items in the cluster 260. Each template 270 is configured to represent a moment in the story. The different templates 270 in the template database may have different characteristics, such as templates 270 for photographs, templates 270 for videos, templates 270 having a specific time period allocated for different media items, templates 270 having different transition effects from one media item to the next media item (e.g., fading characteristics), positioning of the media items, number of media items displayed on the screen in a frame or simultaneously, etc. The template 270 can provide the level of timing in the mixed-media module and/or the layout of elements (e.g., based on time and/or geographic proximity).

The mobile app 150 edits selected media items in the cluster 260 to fit into the selected templates 270 (Step 225). In one embodiment, the mobile app 150 determines a desired sequence for the selected templates and creates a Mixed-Media Module (e.g., video) 275 including the templates organized into the sequence (Step 230). In one embodiment, the determination of a desired sequence includes determining a length of the Mixed-Media Module. The Mixed-Media Module 275 can be a video of the narrative story which encapsulates the moments associated with the story. The created Mixed-Media Module 275 includes video, digital photographs, music, pictures, sound, documents, text, characters, or any other media. In one embodiment, the mobile app 150 can publish the Mixed-Media Module 275 (shown with arrow 280 in FIG. 2B). This publishing may be automatic or may be in response to a user selection or user action.

By way of a non-limiting simple example, suppose a user of a smartphone uses his smartphone to take four photographs and one video of his son during his son's soccer game. The user also has lots of other media on his smartphone, such as hundreds of digital photographs and videos. The first two photographs of the four taken during the soccer game are during warm-ups, the next two photographs are during the game, and the video occurs when the user's son scores a goal in the game. This "story" of the son's soccer game, and the media related to this story, can be made into a Mixed-Media Module (e.g., video) by the mobile app 150, where the Mixed-Media Module includes the 4 photographs and the video. The mobile app 150 may also include a song from the user's song library (e.g., stored on the user's phone) that plays while the Mixed-Media Module plays.

For example, the mobile app 150 can receive, from the client device 105 or from another computing device (e.g., associated with the user, connected to the client device 105 via the Internet, etc.), selections of media items accessible to the user or user devices for use in a Mixed-Media Module that tells a narrative story or event. In another embodiment, the mobile app 150 automatically selects the media items for use in a specific Mixed-Media Module. This automatic selection may be based on multiple media items being captured within a specific time frame or having a time stamp associated with the items within the specific time frame.

As described in more detail below, advertisement server 140 may provide one or more advertisements to the mobile device (e.g., targeted advertisements based on the media item(s) in the Mixed-Media Module).

Figure 3A:
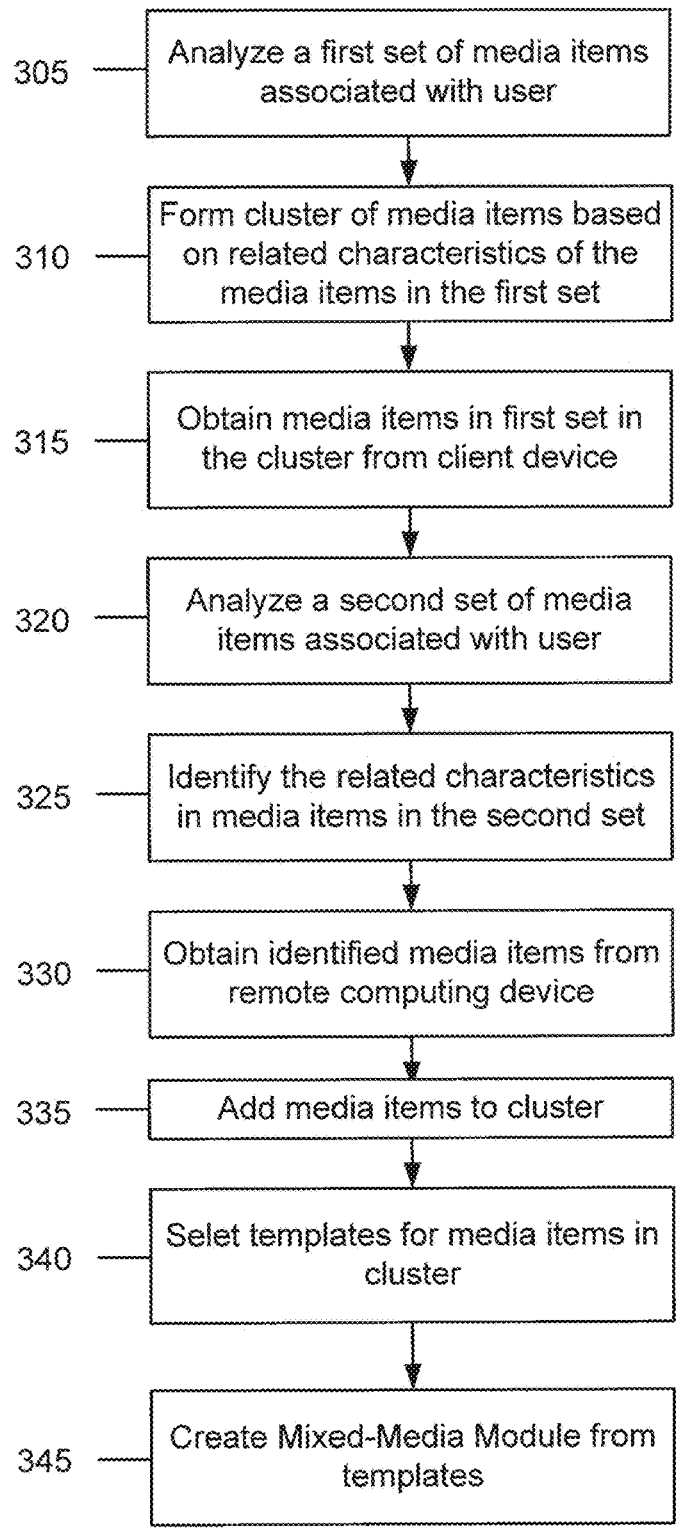
FIG. 3A is a flowchart illustrating steps performed by the client device when executing the mobile app to perform one tap storytelling by obtaining media items from multiple sources in accordance with an embodiment of the present disclosure.
Figure 3B:
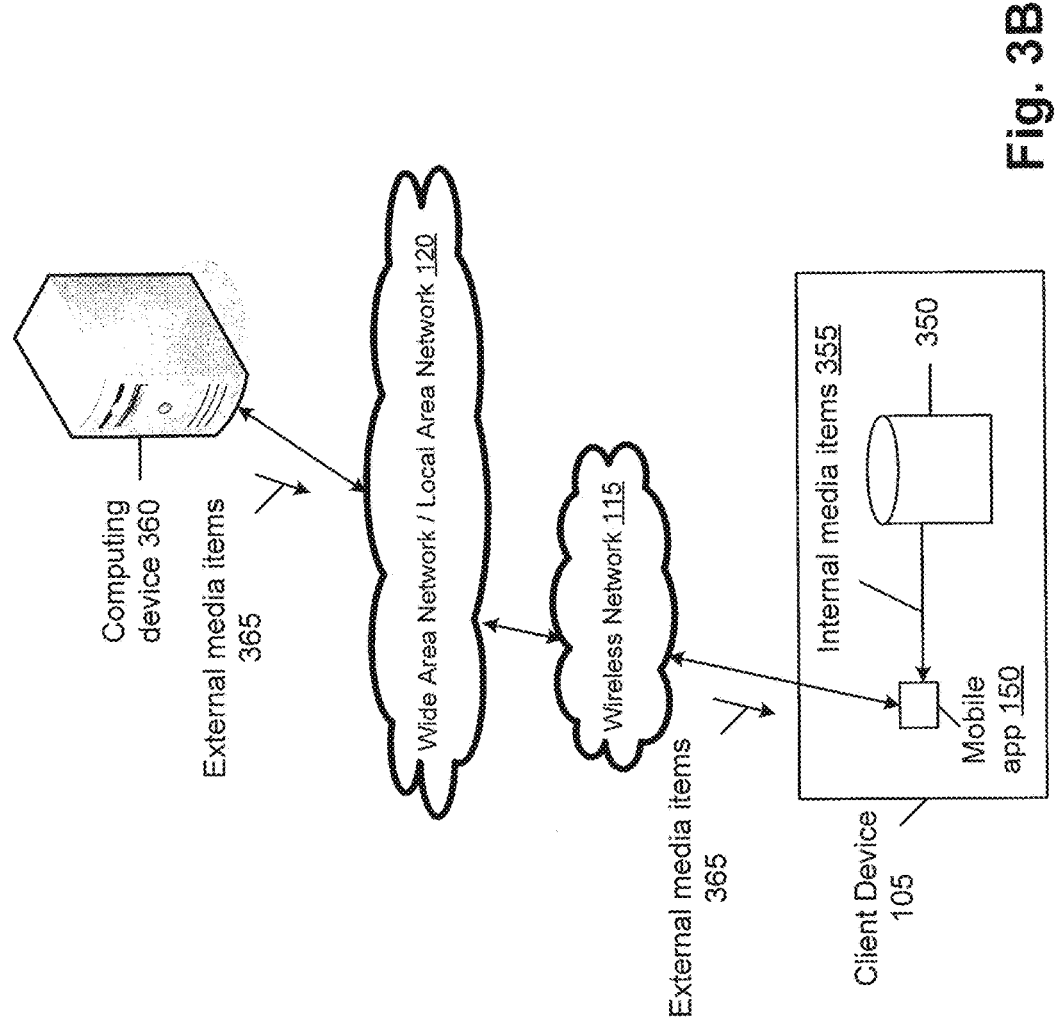
FIG. 3B is a block diagram of the client device to perform one tap storytelling by obtaining media items from multiple sources in accordance with an embodiment of the present disclosure.

Referring to FIGS. 3A and 3B, in one embodiment the mobile app 150 can obtain the media items associated with the user from multiple sources. In one embodiment, the mobile app 150 analyzes a first set of media items, where each media item has associated metadata (Step 305). The mobile app 150 analyzes the items and/or the metadata of each media item in the first set, and identifies one or more related characteristics among the media items in the first set to form a cluster of media items associated with an event (Step 310). The mobile app 150 obtains the media items in the cluster from the client device 105 (e.g., database 350) (Step 315). The obtained media items are represented in FIG. 3B as internal media items 355.

The mobile app 150 then analyzes a second set of media items associated with the user, where each media item in the second set has associated metadata (Step 320). As described in more detail below, the second set of media items may be media items that were captured via a different application on the client device 105. Specifically, in one embodiment the mobile app 150 can monitor other applications installed on the client device 105 and access media generated and shared within those applications to create more robust, relevant, and social Mixed-Media Modules. For example, implementations of the mobile app 150 could automatically access a user's Facebook® or other social media photos to create Mixed-Media Modules.

In one embodiment, the mobile app 150 analyzes the associated metadata of each media item in the second set and identifies, based on this analysis, the one or more related characteristics among one or more media items in the second set (Step 325). The mobile app 150 obtains the one or more media items in the second set (shown in FIG. 3B as external media items 365) from a remote computing device 360 associated with the second set (Step 330). This remote computing device 360 may be another mobile computing device (e.g., another smartphone), a desktop or laptop computer storing media items, cloud storage, a plurality of computers or web sites, etc.

The mobile app 150 adds the obtained media items in the second set to the cluster of media items (Step 335). The mobile app 150 then analyzes the media items in the cluster and selects, based on the analysis of the media items in the cluster, templates from a template database (Step 340). As described herein, each template is configured to represent a moment or time period or sub-topic in the event or story. Mobile app 150 edits the selected media items in the cluster to fit into the selected templates and determines a desired sequence for the selected templates. The mobile app 150 creates a Mixed-Media Module including the templates organized into the sequence (Step 345).

In one embodiment, the mobile app 150 obtains internal media items 355 from a memory 350 of the client device 105. These internal media items 355 can be, for example, photos or videos stored on the client device 105 (e.g., in the Camera Roll of the device 105). In one embodiment, the mobile app 150 obtains external media items 220 initially located on one or more other devices (e.g., device 360) in communication with the mobile client device 105.

In one embodiment, the media items in the second set are related to a social connection of the user. Thus, the mobile app 150 can obtain the one or more (external) media items in the second set from one or more social media sites (e.g., Facebook®, Twitter®, Foursquare®, Instagram®, LinkedIn®, Flickr®, YouTube®, etc.). In one embodiment, the mobile client device 105 requests permission from the other computing device or web site to download the external media item(s) 365 from the other computing device 360 or site. In another embodiment, the mobile client device 105 automatically downloads the external media item 365 from the other computing device 360 or site.

For example, one embodiment allows, that with just one "tap" or user input, users create stories of the events in their life that they have captured through mixed mobile media. Thus, the mobile app 150 enables storytelling with Mixed-Media Modules that can take metadata and information that is recorded when a user takes photos, video, and other multimedia on their mobile device and transmits that media into a dynamic, editable story. This can be set as an automatic feature that creates digital stories (e.g., Mixed-Media Modules), that are ready and waiting to view through the mobile app 150 after the user captures media on their mobile device. Depending on a degree of integration and/or access into the operating system or software or hardware of the client device 105, implementations of Mixed-Media Modules can use even more data from the mobile device 105. The mobile app 150, as a native application on the device 105, would have full access to all of the data created on the mobile device 105, facilitating the telling of fuller stories and more detailed Mixed-Media Module presentations. The Mixed-Media Module can include, for example, two or more of video(s), digital photograph(s), music, picture(s), sound, document(s), text, character(s), or any other media.

As indicated above, in one embodiment a Mixed-Media Module can be created from media items associated with a social media site (e.g., Facebook®). These media items may be uploaded to the social media site by the user or by another individual or company (e.g., an individual or company that has a social connection (e.g., friend, follower, connection, etc.) with the user in the social media site, an advertiser, etc.).

Figure 4:
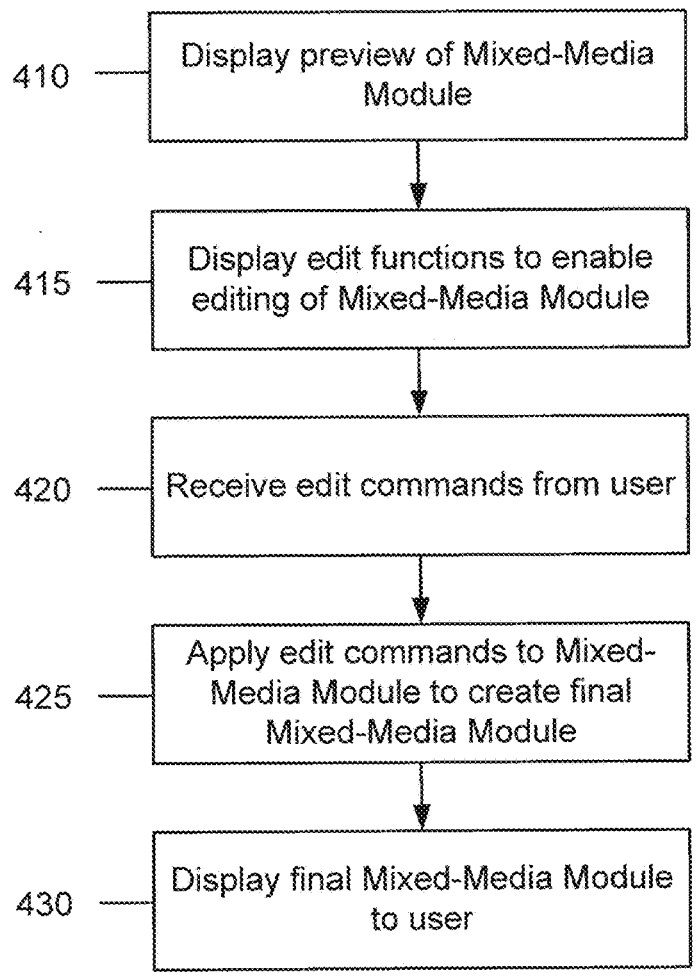
FIG. 4 is a flowchart illustrating steps performed by the client device when executing the mobile app to enable user editing on the mixed-media module in accordance with an embodiment of the present disclosure.

In one embodiment and referring to FIG. 4, after the Mixed-Media Module has been created, the mobile app 150 displays a preview of the Mixed-Media Module (Step 410). The mobile app 150 can also display edit functions to the user for editing the Mixed-Media Module (e.g., one or more media items in the video) (Step 415). The mobile app 150 receives edit commands from the user for editing the Mixed-Media Module (Step 420), and applies these edit commands to the Mixed-Media Module to create a final Mixed-Media Module (Step 425). The mobile app 150 then displays the final Mixed-Media Module to the user (Step 430) and, as stated above, may publish the final Mixed-Media Module.

The edit commands may be for one or more media items and may include, for example, a setting of a pace of the Mixed-Media Module or media item(s) in the Mixed-Media Module, an edit to a media item or to a Mixed-Media Module, adding a song to the Mixed-Media Module or to a media item, receiving a title for the Mixed-Media Module or media item, receiving media and/or captions to add to the Mixed-Media Module, receiving additional moments for the Mixed-Media Module, receiving a description for the Mixed-Media Module or media item, enabling sharing of the Mixed-Media Module or media item, receiving a tag associated with the Mixed-Media Module or media item, cropping a media item or Mixed-Media Module, fading or transitioning effects, etc.

Figure 5:
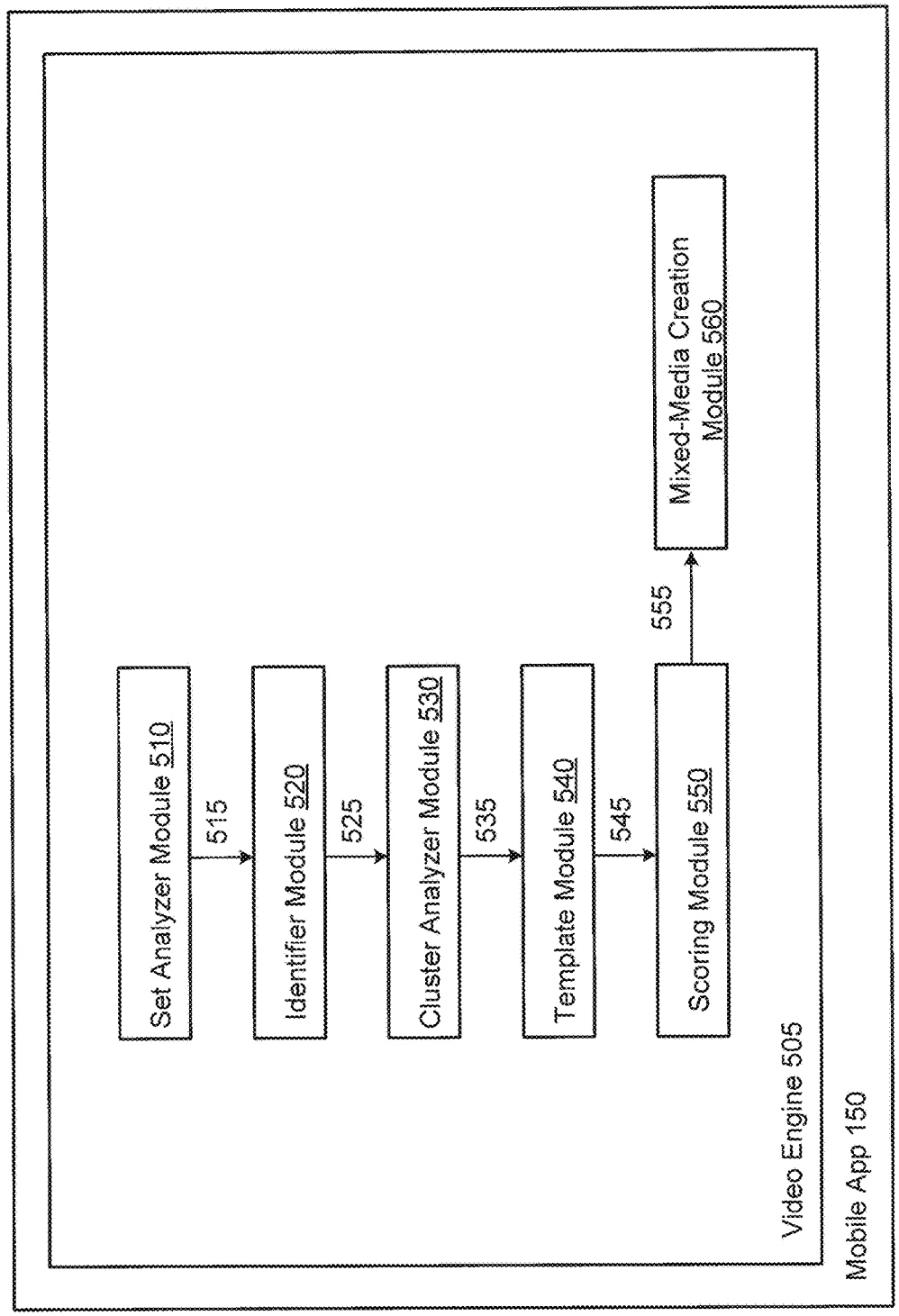
FIG. 5 is a block diagram of a video engine used to create the mixed-media module in accordance with an embodiment of the present disclosure.
Figure 6:
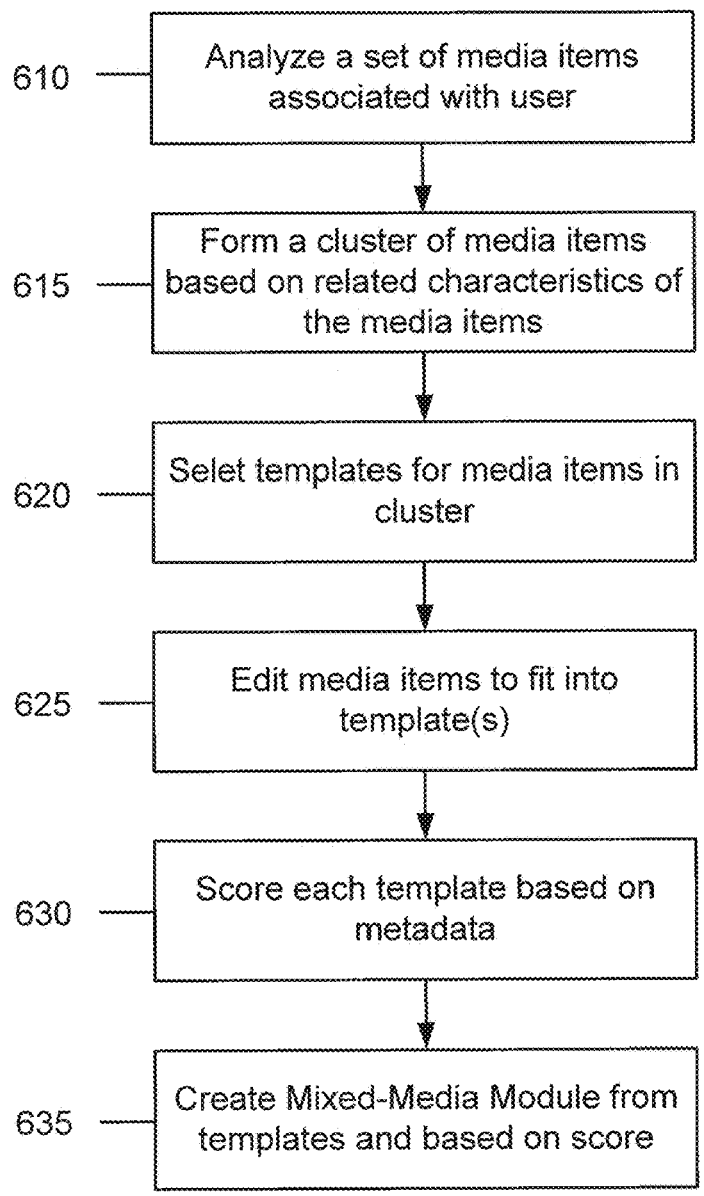
FIG. 6 is a flowchart illustrating steps performed by the video engine to create the mixed-media module in accordance with an embodiment of the present disclosure.

Referring to FIGS. 5 and 6, in one embodiment the mobile app 150 includes or is associated with a video engine 505 for creating the Mixed-Media Module. The video engine 505 can be, for example, software, hardware, and/or firmware. The video engine 505 can include modules or logic to create the Mixed-Media Module. In one embodiment, the video engine 505 includes a set analyzer module 510 for analyzing a set of media items associated with the user, where each media item has associated metadata (Step 610). The set analyzer module 510 analyzes the associated metadata of each media item in the set. The set analyzer module 510 transmits the analyzed media items and their associated metadata 515 to an identifier module 520. The identifier module 520 identifies, based on the analysis of the associated metadata, one or more related characteristics among the media items in the set to form a cluster of media items associated with an event associated with the user (Step 615). The related characteristics of the media items may be, for example, that two or more of the media items were captured within a predetermined or set time period, that two or more media items have been tagged with a common or similar tag, that two or more media items are captured in the same or similar location (geographic proximity), or have images of the same people, or other media characteristics obtainable from the media item and/or its metadata.

The identifier module 520 transmits the cluster 525 to the cluster analyzer module 530, and the cluster analyzer module 530 analyzes the media items in the cluster. The cluster analyzer module 530 transmits the analyzed cluster 535 to a template module 540, and the template module 540 selects, based on the analysis of the media items in the cluster, templates from a template database (Step 620). Each template is configured to represent a moment in the event. A template, or layout, determines how the media item(s) in the cluster are positioned and/or configured in a layout for the video to represent the moment. The template module 540 edits or modifies the selected media items in the cluster to fit into the selected templates (Step 625). The template module 540 transmits the templates 545 to a scoring module 550. The scoring module 550 scores each selected template 545 based on the metadata associated with the selected media items in the selected template (Step 630). As described in more detail herein, the score may be based on, e.g., the media item(s) contained in the template and the scoring module 550 may provide additional bonus value if the moment is the highest scoring moment in the cluster. For example, as described below, a portrait image may obtain a score of 1 point, a landscape image may obtain a score of 2 points, a video may obtain a score of 3 points, and a highest scoring moment may obtain a bonus score (e.g., 5 points).

In one embodiment, the scoring module 550 then determines, based on the scoring, a time period of display for each of the selected media items in the selected templates. The scoring module 550 also determines a desired sequence for the templates based on the scoring and based on the determined time periods of display. The scoring module 550 transmits the scored templates 555 to a Mixed-Media creation module 560. The Mixed-Media creation module 560 creates a Mixed-Media Module of predetermined duration including the templates organized into the desired sequence and in accordance with the determined time periods (Step 635).

Figure 7:
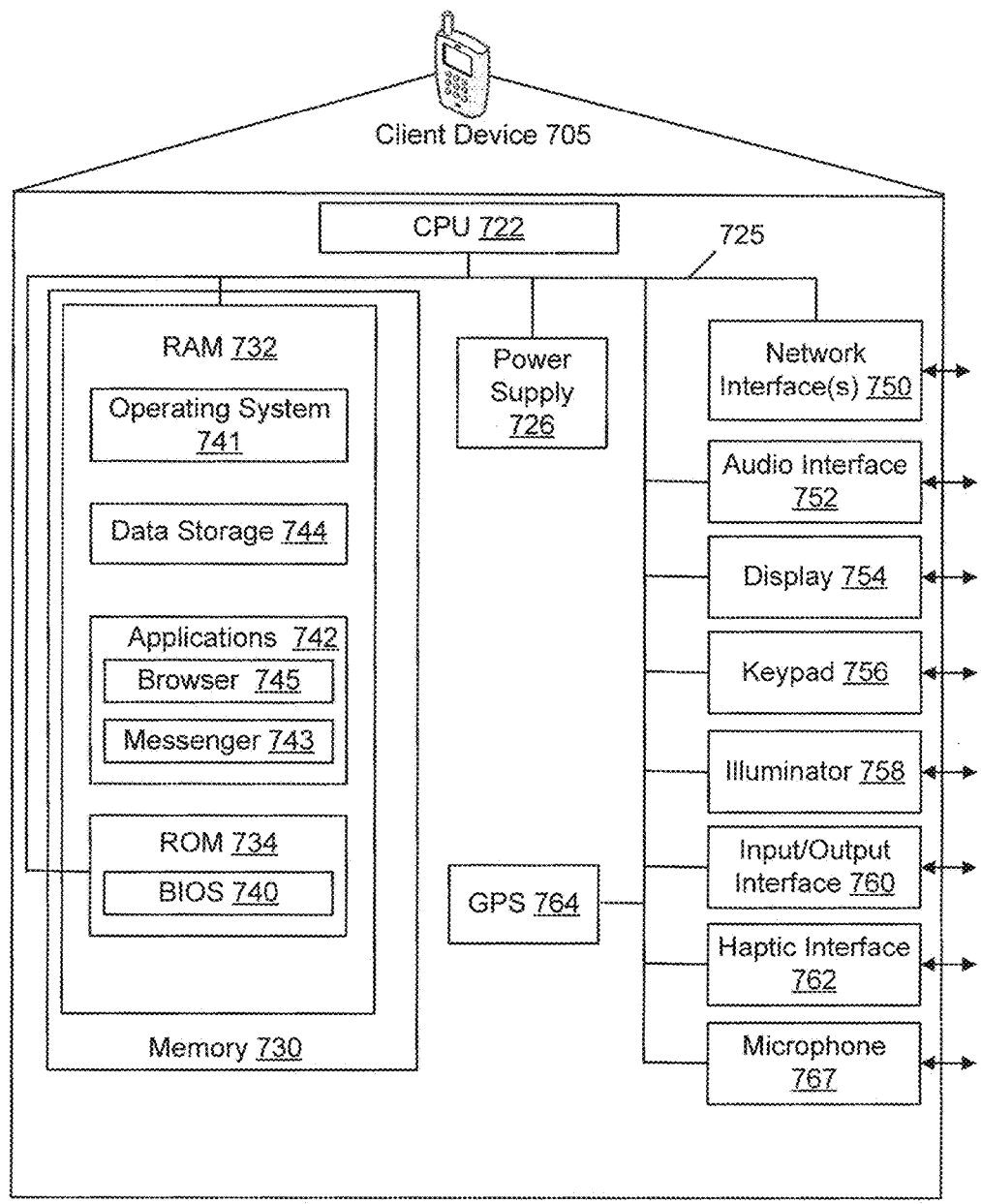
FIG. 7 depicts one example of a schematic diagram illustrating a client device in accordance with an embodiment of the present disclosure.

As shown in the example of FIG. 7, client device 705 may include one or more processing units (also referred to herein as CPUs) 722, which interface with at least one computer bus 725. A memory 730 can be persistent storage and interfaces with the computer bus 725. The memory 730 includes RAM 732 and ROM 734. ROM 734 includes a BIOS 740. Memory 730 interfaces with computer bus 725 so as to provide information stored in memory 730 to CPU 722 during execution of software programs such as an operating system 741, application programs 742, device drivers, and software modules 743, 745 that comprise program code, and/or computer-executable process steps, incorporating functionality described herein, e.g., one or more of process flows described herein. CPU 722 first loads computer-executable process steps from storage, e.g., memory 732, data storage medium/media 744, removable media drive, and/or other storage device. CPU 722 can then execute the stored process steps in order to execute the loaded computer-executable process steps. Stored data, e.g., data stored by a storage device, can be accessed by CPU 722 during the execution of computer-executable process steps.

Persistent storage medium/media 744 is a computer readable storage medium(s) that can be used to store software and data, e.g., an operating system and one or more application programs. Persistent storage medium/media 744 can also be used to store device drivers, such as one or more of a digital camera driver, monitor driver, printer driver, scanner driver, or other device drivers, web pages, content files, playlists and other files. Persistent storage medium/media 706 can further include program modules and data files used to implement one or more embodiments of the present disclosure.

For the purposes of this disclosure a computer readable medium stores computer data, which data can include computer program code that is executable by a computer, in machine readable form. By way of example, and not limitation, a computer readable medium may comprise computer readable storage media, for tangible or fixed storage of data, or communication media for transient interpretation of code-containing signals. Computer readable storage media, as used herein, refers to physical or tangible storage (as opposed to signals) and includes without limitation volatile and non-volatile, removable and non-removable media implemented in any method or technology for the tangible storage of information such as computer-readable instructions, data structures, program modules or other data. Computer readable storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other physical or material medium which can be used to tangibly store the desired information or data or instructions and which can be accessed by a computer or processor.

Client device 705 can also include one or more of a power supply 726, network interface 750, audio interface 752, a display 754 (e.g., a monitor or screen), keypad 756, illuminator 758, I/O interface 760, a haptic interface 762, a GPS 764, a microphone 767, a video camera, TV/radio tuner, audio/video capture card, sound card, analog audio input with A/D converter, modem, digital media input (HDMI, optical link), digital I/O ports (RS232, USB, FireWire, Thunderbolt), expansion slots (PCMCIA, ExpressCard, PCI, PCIe).

For the purposes of this disclosure a module is a software, hardware, or firmware (or combinations thereof) system, process or functionality, or component thereof, that performs or facilitates the processes, features, and/or functions described herein (with or without human interaction or augmentation). A module can include sub-modules. Software components of a module may be stored on a computer readable medium. Modules may be integral to one or more servers, or be loaded and executed by one or more servers. One or more modules may be grouped into an engine or an application.

Figure 8:
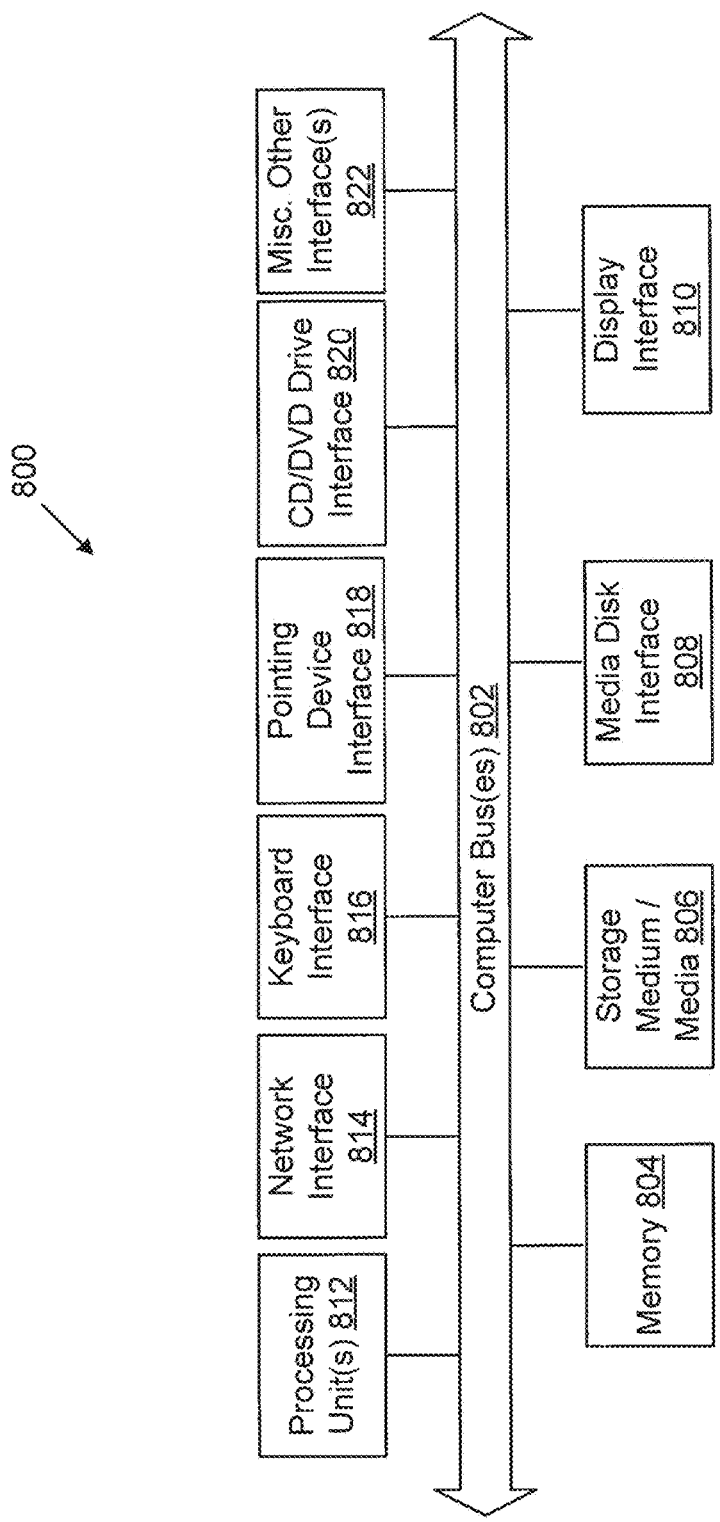
FIG. 8 is a block diagram illustrating an internal architecture of a computer in accordance with an embodiment of the present disclosure.

FIG. 8 is a block diagram illustrating an internal architecture of an example of a computer, such as server computer 130 and/or client device 105, in accordance with one or more embodiments of the present disclosure. A computer as referred to herein refers to any device with a processor capable of executing logic or coded instructions, and could be a server, personal computer, set top box, tablet, smart phone, pad computer or media device, to name a few such devices. As shown in the example of FIG. 8, internal architecture 800 includes one or more processing units (also referred to herein as CPUs) 812, which interface with at least one computer bus 802. Also interfacing with computer bus 802 are persistent storage medium/media 806, network interface 814, memory 804, e.g., random access memory (RAM), run-time transient memory, read only memory (ROM), etc., media disk drive interface 808 as an interface for a drive that can read and/or write to media including removable media such as floppy, CD-ROM, DVD, etc. media, display interface 810 as interface for a monitor or other display device, keyboard interface 816 as interface for a keyboard, pointing device interface 818 as an interface for a mouse or other pointing device, CD/DVD drive interface 820, and miscellaneous other interfaces (e.g., interface 822) not shown individually, such as parallel and serial port interfaces, a universal serial bus (USB) interface, and the like.

Memory 804 interfaces with computer bus 802 so as to provide information stored in memory 804 to CPU 812 during execution of software programs such as an operating system, application programs, device drivers, and software modules that comprise program code, and/or computer-executable process steps, incorporating functionality described herein, e.g., one or more of process flows described herein. CPU 812 first loads computer-executable process steps from storage, e.g., memory 804, storage medium/media 806, removable media drive, and/or other storage device. CPU 812 can then execute the stored process steps in order to execute the loaded computer-executable process steps. Stored data, e.g., data stored by a storage device, can be accessed by CPU 812 during the execution of computer-executable process steps.

As described above, persistent storage medium/media 806 is a computer readable storage medium(s) that can be used to store software and data, e.g., an operating system and one or more application programs. Persistent storage medium/media 806 can also be used to store device drivers, such as one or more of a digital camera driver, monitor driver, printer driver, scanner driver, or other device drivers, web pages, content files, playlists and other files. Persistent storage medium/media 806 can further include program modules and data files used to implement one or more embodiments of the present disclosure.

Internal architecture 800 of the computer can include (as stated above), a microphone, video camera, TV/radio tuner, audio/video capture card, sound card, analog audio input with A/D converter, modem, digital media input (HDMI, optical link), digital I/O ports (RS232, USB, FireWire, Thunderbolt), and/or expansion slots (PCMCIA, ExpressCard, PCI, PCIe).

In more detail, the mobile app 150, as a native application to the mobile device 105, has more extensive use of the mobile device's resources including memory, processor, permissions to other native applications, and further access to enable implementations of the mobile app 150 to add more sophisticated features like: enhanced notifications, pre-rendering and uploading of media "off screen", etc. All of these operations would help create better Mixed-Media Modules more efficiently by accessing the users' real-life timeline.

In one embodiment, the mobile app 150 enables iOS and Android users, for example, or any other kind of mobile operating system, to tell stories in one tap. Implementations herein, accordingly, make storytelling on a mobile device 105 quick and allow users to share events in beautiful presentations (Mixed-Media Modules 275) (e.g., as they are happening).

As described above, the mobile app 150 can, in one embodiment, automatically turn collections of mixed media items created on a mobile device 105 into presentations 275 using metadata and other properties stored in photos and videos from the user's mobile device library. For example, one embodiment enables, with just one tap of their finger, users to create stories of the events in their life that they have captured through mobile media. By simplifying storytelling and social collaboration on mobile devices, the mobile app 150 can, via the created Mixed-Media Module, deepen a user's ties to the captured events and the people in them. The mobile app 150 with Mixed-Media Modules make it easier to digitally document and broadcast experiences, not just static moments in time.

In one embodiment, the mobile app 150 can create a Mixed-Media Module 275 automatically, so that they are ready and waiting to view through the mobile app 150 after the user captures media items on their mobile device 105. In one embodiment, the mobile app 150 is configured for customization. This means that authors of Mixed-Media Modules 275 can make different projects distinctive on their mobile device 105. In some implementations, for example, authors/users can use the mobile app 150 to form their captured media items into an interactive, professional looking video presentation 275 that tells the story of an event or moment without the time, expenses or limitations of current video editing technology.

In further implementations, the processing of the animation for the Mixed-Media Module 275 may also be offloaded to the device 105 playing back the Mixed-Media Module 275, which means bandwidth is preserved. According to some exemplary embodiments, the animation is defined in a text-based format as opposed to a binary data format, making it more efficient and entirely cross-platform (e.g., IOS, Android, Blackberry, etc.).

Within each event, in one embodiment the mobile app 150 can coordinate the display of pictures and videos taken within relevant timings of each other for storytelling and aesthetic impact. This is the "moment"—that is, the level of timing in the presentation 275, and the layout of elements, based on, e.g., time and geographic proximity.

In one embodiment, the mobile app 150 can enable users to tag venues, and animate the media recorded at those venues alongside data on the venue's address, ratings, etc. The mobile app 150 may also utilize moment-level metadata to assemble animations (for instance, a user can show a restaurant's venue animation prior to all the photos taken at the restaurant). With full access to other applications native to the device 105, implementations of the mobile app 150 can use data from those applications to create context around events and tell a more complete story.

Advertising can be targeted more effectively, as a Mixed-Media Module author may have control over the types of advertising viewed by their audience, or the ad insertion could be automatic. The mobile app 150, when native to the mobile device 105, can access other applications on that mobile device 105 and can use that shared metadata to identify and apply valuable information to targeting relevant advertising. In this way, the systems and methods herein may also involve a Mixed-Media Modules ad suggestion engine that enhances the advertising experience for both the Mixed-Media Modules author and the audience. In embodiments, metadata can be analyzed to extract or form ad keywords that can be fed to an ad server or ad platform to result in context-relevant ads being included before, during, or after the Mixed-Media Module 275.

In still further implementations, ads on Mixed-Media Modules 275 may be configured like ads in a magazine—selected by the author or publisher to fit the audience and the adjacent content. As such, the added context and relevance of ads may result in a higher CPM for advertisers who will pay higher rates for better results and more targeted viewers. Also, features herein allow advertising and interactive advertising to be integrated seamlessly without interrupting the viewing experience and so preserving the quality and user experience of the Mixed-Media Modules presentations 275.

The mobile app 150 can, in one embodiment, determine how the user of the mobile device 105 uses their device 105. As described above, this means that the mobile app 150 can monitor other applications installed on the device 105 and access media generated and shared within those applications to create more robust, relevant, and social Mixed-Media Modules 275.

For example, implementations of the mobile app 150 can automatically access a user's Facebook® photos to create Mixed-Media Modules 275. This could include the photos the user has uploaded to Facebook®, or other social media site, and photos the user has been tagged in by their Facebook® friends. Access to the historic media roll of other social networks and the associated metadata can be used to improve the relevance and robustness of the presentations 275 by enabling the auto-reference of locations and people who make moments meaningful.

In some implementations, the mobile app 150 can render raw video files using the mobile device 105, but the user must be "on screen" in the application 150. In other implementations, the mobile app 150 performs this operation even while the user is "off screen" in another application. This can improve the efficiency of creating Mixed-Media Modules 275, saving the users time and allowing them to create more stories using the system. For example, implementations of the Mixed-Media Modules mobile app 150 can render a video 275 on the mobile handset allowing the user to then upload that video 275 to YouTube®, Facebook®, or any other website to syndicate to a larger audience.

By adding background operations post-rendering, in one embodiment the mobile app 150 can improve viral sharing based on user preferences. Instead of manually uploading the newly rendered Mixed Media Module 275 to social media and video hosting website(s), implementations of the mobile app 150 can auto-upload rendered Mixed Media Modules 275 to websites based on permissions set by the user. Specifically, for example, the mobile app 150 can auto-upload that Mixed Media Module 275 to YouTube®, Facebook®, Twitter®, or any other website to syndicate to a larger audience by allowing the user to set that permission and link their YouTube®, Facebook®, Twitter® or other social media account to the Mixed-Media Module and/or mobile app 150.

Exemplary implementations may be configured to allow users to open the app 150, and be greeted with a list of new events identified, and a user can be prompted to publish them as independent, interactive presentations 275. This is an embodiment of a notification to publish automatically clustered moments. The mobile app 150 may also be configured to allow for the display of an automatically created draft with one-tap customization. Again, if a user wished to customize, they can do so via a simple tagging interface. Systems and methods herein may also be configured to allow for tagging of metadata from authorized applications (friends, locations) to generate animations. Title, location, venue, friends and other identifying animations are generated from metadata attached to the photos—either from the camera roll, or third party social network sources like Facebook® and Foursquare®.

The mobile app 150 may also allow the user to apply multiple filters to multiple videos and images at a single time. According to systems and methods herein, users don't simply select filters—they set styles, which are combinations of image filter, video filter, font and caption effects that apply to the media in a given Mixed-Media Module 275. There are optional style plug-ins users can choose to emulate other famous styles. This helps the user easily create context linking of their media in order to tell a story.

The mobile app 150 can also be used to collaborate with friends after an event to share captured media and create shared stories in the form of associated Mixed-Media Module implementations configured for such utilization. In one embodiment, one or more of the following steps are performed:

1) After the event, a user can define the event by entering a start date/time and an end date/time, and can then blast a message to friends asking if they'd like to share their media from this event. All the friends have to do is agree (e.g., tap YES) to include their media in the user's presentation/module (Mixed-Media Module) 275.
2) The same process may also be configured to execute automatically (e.g., the mobile app 150 ascertains that there was an event that took place on day X from Y am to Z pm, and prompts the user to ask friends for media).
3) A user's friends grant the processing component(s) access to their camera roll, and as the user creates Mixed-Media Modules 275, the mobile app 150 automatically searches their camera rolls for relevant media items and adds them to the user's Mixed-Media Module 275.

Implementations herein can turn collections of mixed media into a storyline or narrative presentation using metadata and other properties stored in photos and videos from the user's media library. The following are sets of optional rules or strategies that can help arrange and format the presentations. Combinations of the rules and strategies can be employed in different presentations. Not all are necessary to be used each time and any combination can be used. In one embodiment, one or more of the following steps are performed:

(1) Identification of the important events in the user's life, such as via processing/organizing event-level "clusters" of media based on time and geographic proximity.
(2) Generation of moment-level timing and/or layout of the presentation based, e.g., on time and geographic proximity, and which may also be coordinated for maximum storytelling and aesthetic impact.
(3) Assigning animations and/or pacing of presentation, e.g., using moment-level metadata from application(s) of authorized device(s) for maximum storytelling and aesthetic impact.

Implementations herein may include or involve a clustering algorithm that identifies the events in the user's life based around the amount of media captured on a mobile device in a certain time and place, then clusters this media and presents these events for playback and editing as a self-contained Mixed-Media Module 275.

The implementation/application accesses and analyzes photos from the user's camera roll or media library or authorized applications enabled by, for example, full stack access.

Processing herein can then utilize a time range as the bounds for selection, automatically extracting events from the set of mixed media items. Some implementations may be configured such that there are three included time ranges, and may also be configured such that users may define custom time spans as shown, for example, in FIG. 9 with a Story Rank Algorithm 900. The Story Rank Algorithm 900 can include different speeds 905 for different media types and different scenarios. FIG. 9 also shows a time allocation worksheet 910 which illustrates different speeds for a portrait media 915, a landscape media 920, and videos 925. Examples may include:

Day: identified as 5:01 am to 5:00 am the following day
Weekend: identified as 6:00 pm on a Friday to Monday at 5:00 am
Special event: identified as any 2-hour period where more than 9 pieces of media are captured A user can manually create a Mixed-Media Module 275 by accessing their mobile device's photo library or media from authorized applications and selecting a set of mixed media items to include. For example, some systems may be configured to allow a user to select up to 30 pieces of mixed media to include or some greater or smaller number. Such implementations/processes can create a story from that set of media items and apply the same rules to the generation process.

Given the media from an event, the mobile app 150 can then group them into moments according to rules around the frequency in which it was taken. An example goal of this process is to use the timeline the user implicitly creates while capturing media to inform the creation of a linear story composed of audio and visual components.

In one embodiment, the mobile app 150 may be configured to find the time-delta between capture of each media item. It can then obtain the average time-delta between each media item. Using the average time-delta, it can split media items into moments. It then iterates across each piece of media and, when a time-delta of capture time is detected that is longer than the average time-delta, the mobile app 150 can group the preceding media into a moment.

In some implementations and as introduced above, for ranking purposes, each moment can be given a score based on the media item(s) contained in the moment and an additional bonus value if the moment is the highest scoring moment. For example:

Portrait image: 1 point
Landscape image: 2 points
Video: 3 points
Highest scoring moment bonus: 5 points The mobile app 150 may be configured to identify display speed, and based on the moment's scores, the Mixed-Media Module 275 can be applied a display speed. Mixed-Media Module configurations herein may have many speeds, such as, for example, three display speeds: "Fast", "Medium" or "Slow", each of which has default timing values for each type of media. Note these scores can be further modified via a granular "slider" control bar exposed to the user, allowing for custom speed application. For example, I. If there are two or more moments with a score of 10 or above, the Mixed-Media Module may be set/configured to "Fast"
II. If there is one moment with a score of 10 or above, the Mixed-Media Module may be set/configured to "Medium"
III. All others scores, Mixed-Media Module is "Slow"

Configurations also include other speeds, which may also be customized, customizable and/or changed.

|  | "Fast" | "Medium" | "Slow" |
| --- | --- | --- | --- |
| Portrait Image | 0.75 seconds | 1.25 seconds | 1.75 seconds |
| Landscape Image | 1 second | 1.75 seconds | 2.25 seconds |
| Video | 4 seconds | 5 seconds | 6 seconds |

Further configurations include, if the Mixed-Media Module play time is greater than a predetermined time (e.g., 30 seconds), group media within moments. If a Mixed-Media Module play time exceeds its predetermined time limit (e.g., 30-second limit), media within moments can be collapsed upon each other and displayed within the same timespan via a variety of layouts (often referred to as "grids"). This allows for more media to be displayed in less time. It begins by collapsing the lowest scoring moment into multimedia layouts. If the Mixed-Media Module play time is still less than its limit (e.g., 30-seconds), continue the previous step until the Mixed-Media Module play time is less than or equal to its limit (e.g., 30 seconds). Videos are also being processed to increase display speed (via fast forward) or decrease display speed (via slow-motion) to match the relative fast, medium, or slow pacing of the Mixed-Media Module playback.

Figure 10A:
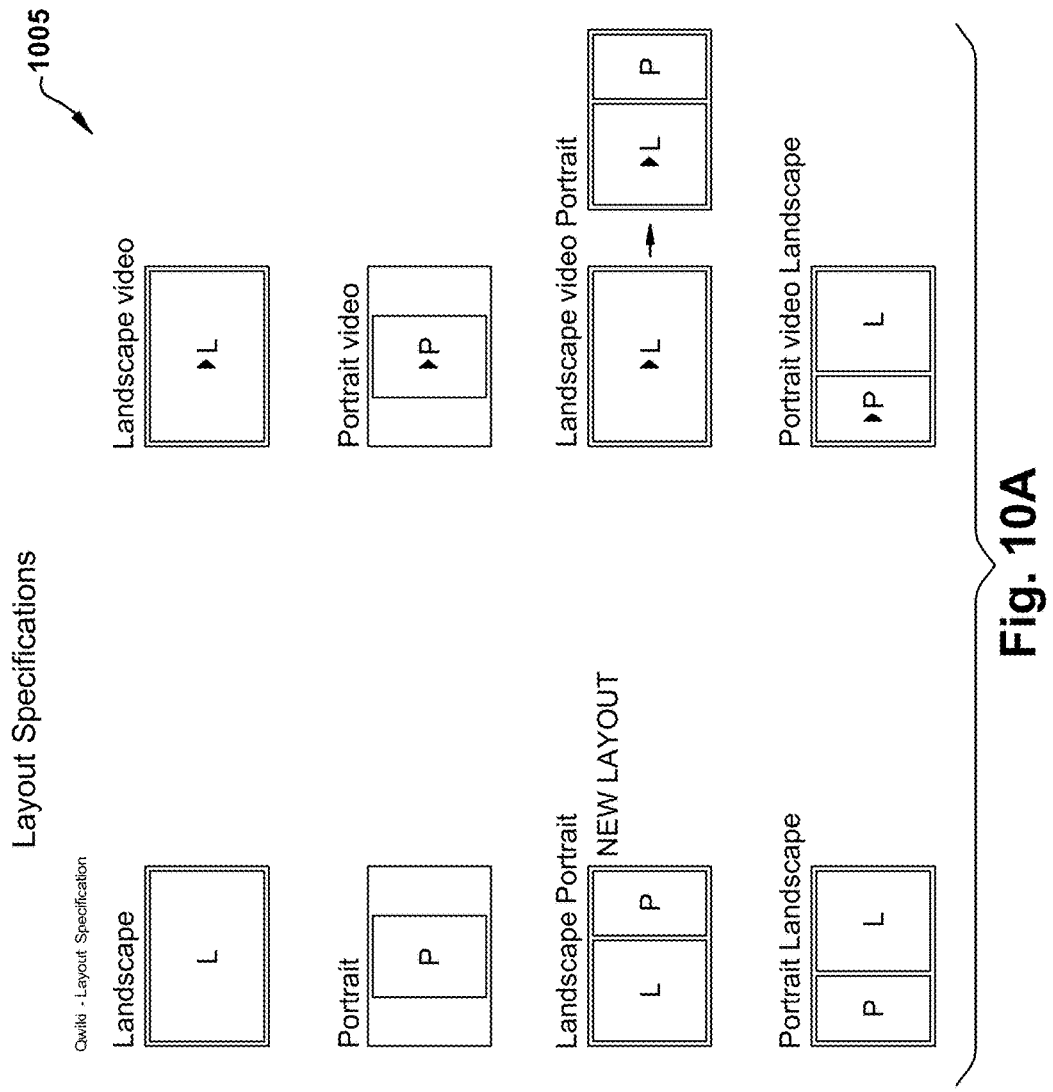
FIGS. 10A, 10B, and 10C are block diagrams showing layouts or templates used to create the mixed-media module in accordance with an embodiment of the present disclosure.
Figure 10B:
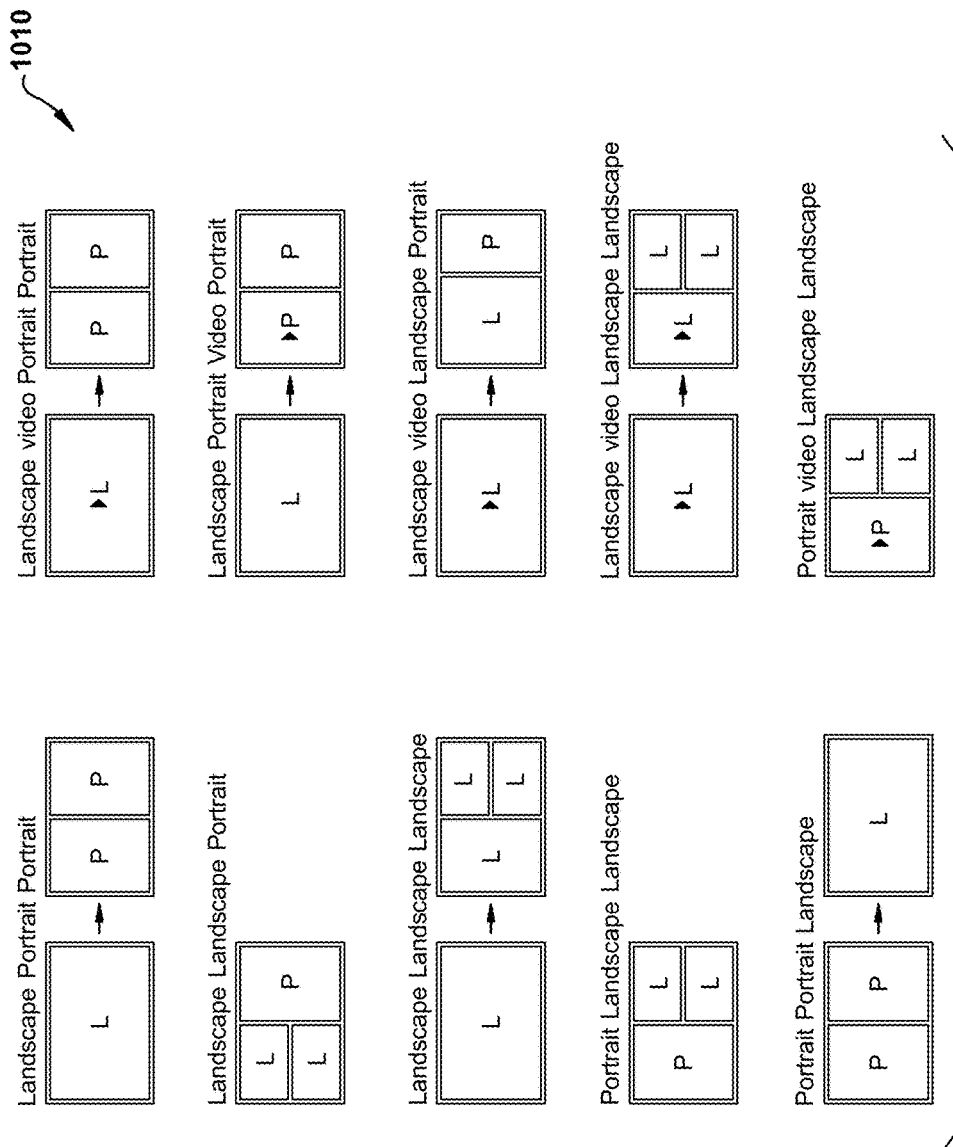
Figure 10C:
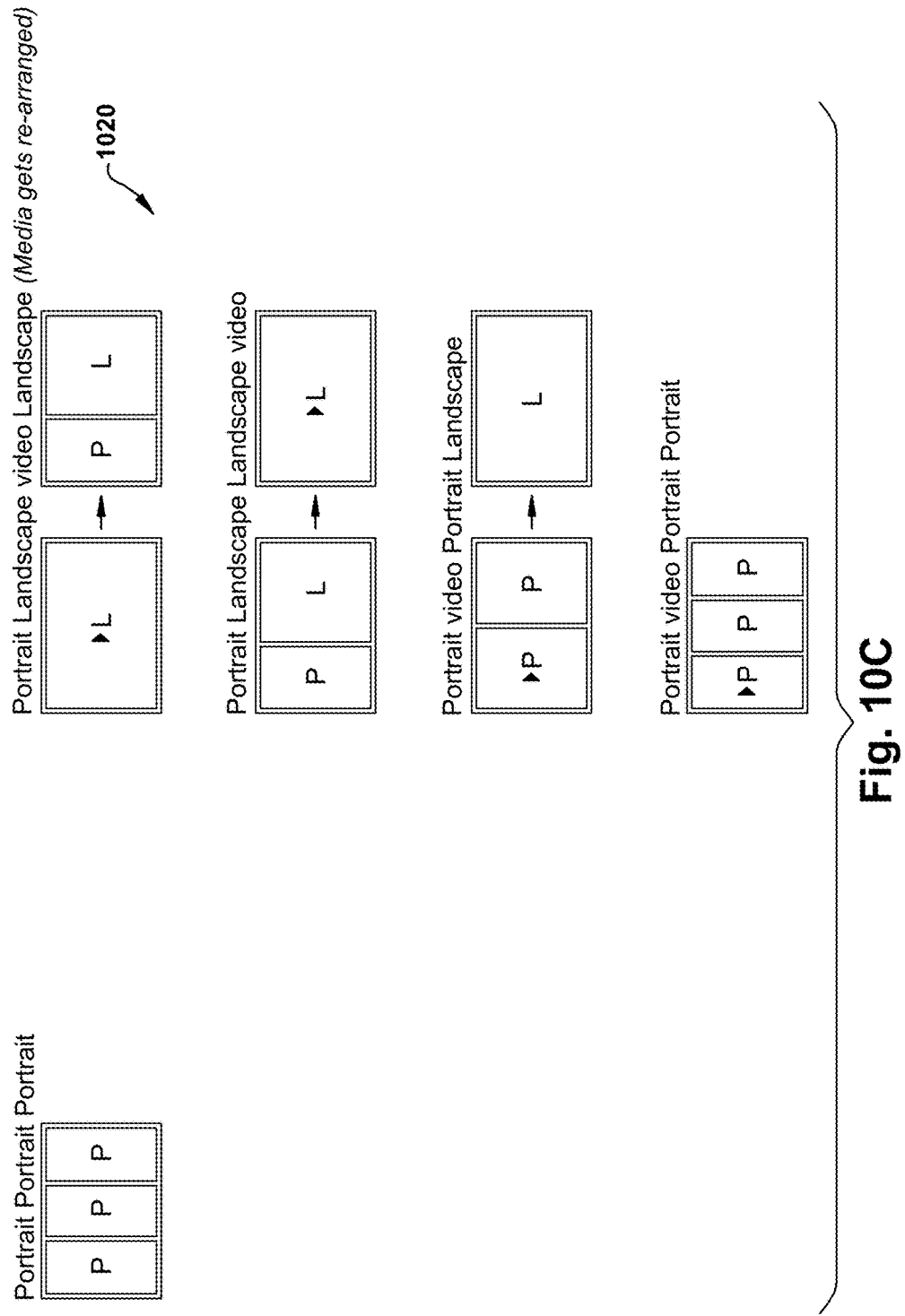

Implementations may be configured such that a user can choose layouts (e.g., templates) based on the collections of media within moments. There may be numerous layout styles that are targeted towards collections of 1-4 pieces of media and containing different animation styles. These layout styles are shown, e.g., in layout styles 1005, 1010, and 1020 of FIGS. 10A, 10B, and 10C, respectively. Media grouped in layouts can be displayed all at once in a "total reveal" or in sequence in a "cascading reveal" as shown, for example, in FIGS. 10A, 10B, and 10C.

In one embodiment, the mobile app 150 applies dynamic pacing for storytelling. For example, the first media, if it's an image, is displayed twice as long. The last media, if it's an image, can be displayed, e.g., twice as long. The highest scoring moment gets applied a unique treatment which can include, e.g.:

Adjusting display times of media relative to the Mixed-Media Module play back: faster or slower Unique transition effects in between or during media display Applying a unique layout of the media that is not used elsewhere during playback In one embodiment, escalation of effects preceding the highest scoring moment means that moments immediately preceding the highest scoring moment are applied unique transitions to signal the upcoming unique display properties of the highest scoring moment.

It is contemplated that a song (or songs) will be incorporated into the story of the Mixed-Media Module as a soundtrack. Songs can be found among a user's available media or downloaded from network accessible sources. In embodiments, the song title or genre is selected to match the story context. If beats per minute (BPM) for the song is known, the mobile app 150 can augment the display times for media to compensate for the beat of the song, matching to whole beats, half beats, or quarter beats, thus matching the transitions. In one embodiment, the geographical & time data is used to set titles for implementations of the Mixed-Media Modules 275.

In exemplary implementations, the mobile app 150 can actively monitor a user's photo library from their mobile device, and, upon detection of a set of media that corresponds to an existing Mixed-Media Module 275, through using the rules above, that Mixed-Media Module presentation 275 can be generated. The user can be notified of the creation of a Mixed-Media Module 275 using one or more messages.

Figure 11:
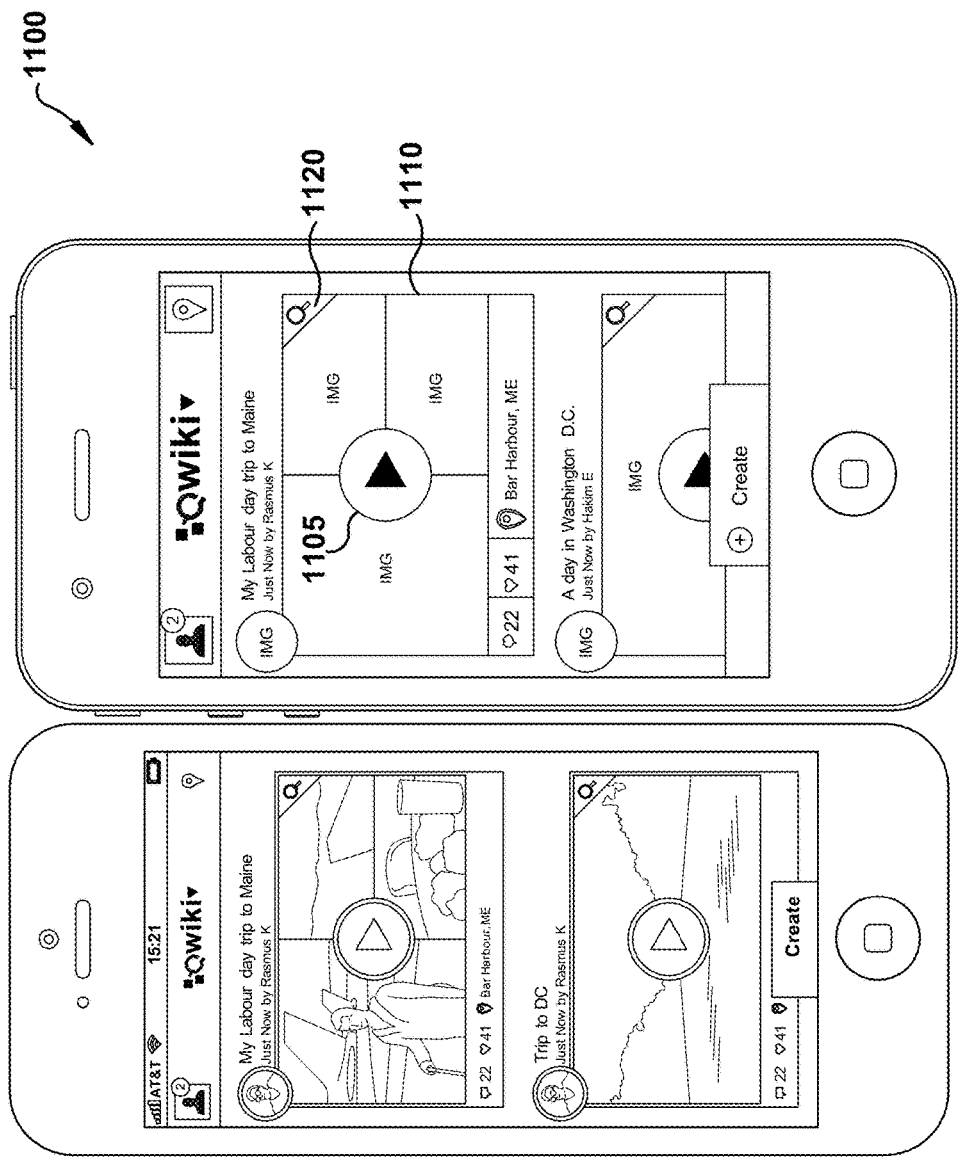
FIG. 11 shows a play mixed-media module screenshot of the mobile app in accordance with an embodiment of the present disclosure.

In one embodiment, shown in play mixed-media module screenshot 1100 of FIG. 11, tapping a play button 1105 can play Mixed-Media Module 1110. In one embodiment, tapping a magnifying glass icon 1120 can put the Mixed-Media Module 1105 in preview mode. The user can view, for example, comments, users who liked the presentation, and additional other Mixed-Media Modules 1105 associated with the tagged location.

Figure 12:
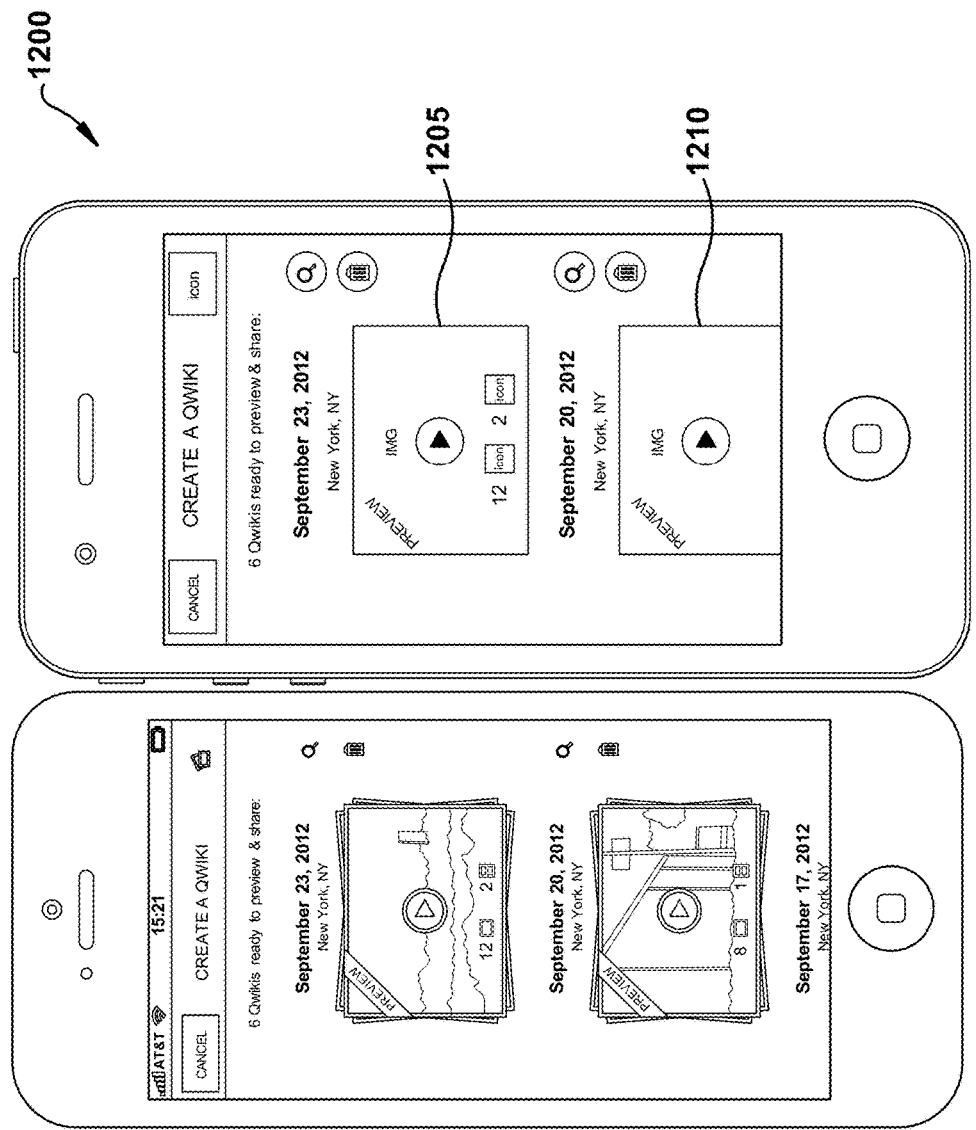
FIG. 12 shows a preview screenshot of the mobile app in accordance with an embodiment of the present disclosure.

FIG. 12 shows an example preview screenshot 1200 where, in one embodiment, Mixed-Media Modules 275 are labeled as previews 1205, 1210 when they are unpublished. In one embodiment, tapping the magnifying glass switches the stack of media to preview mode.

Figure 13:
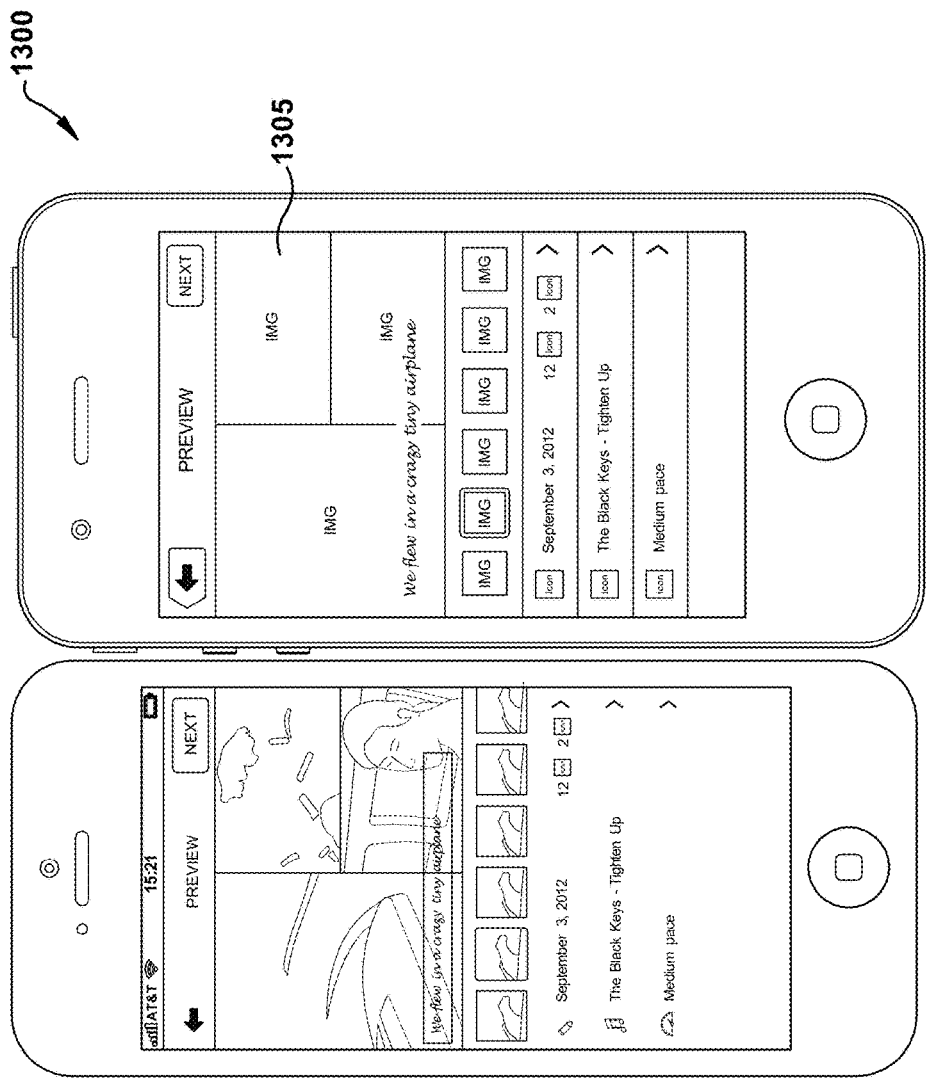
FIG. 13 shows an edit screenshot of the mobile app in accordance with an embodiment of the present disclosure.
Figure 17:
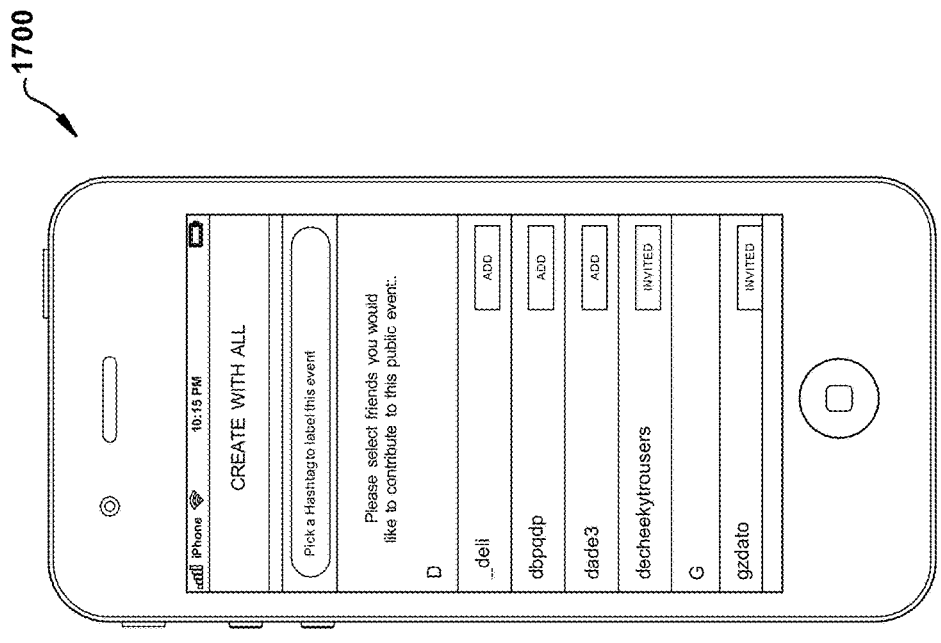
FIG. 17 shows a create with all screenshot of the mobile app in accordance with an embodiment of the present disclosure.
Figure 16:
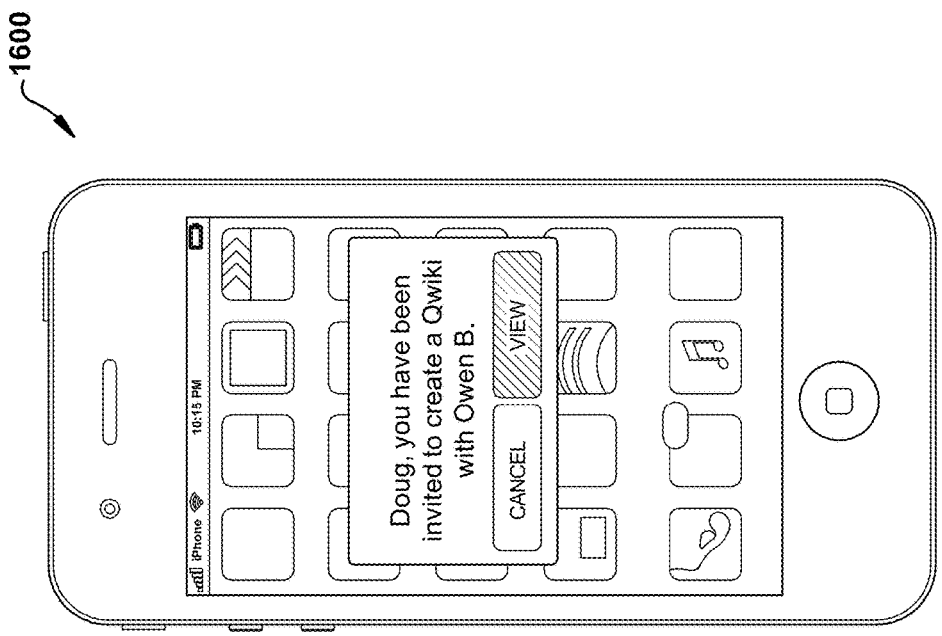
FIG. 16 shows a user invitation screenshot of the mobile app in accordance with an embodiment of the present disclosure.
Figure 20:
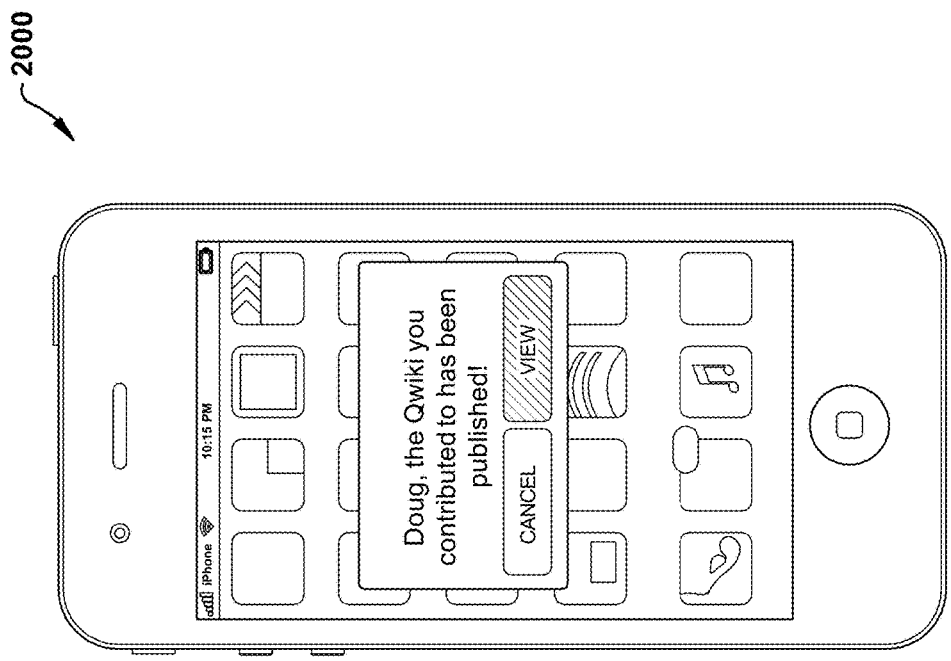
FIG. 20 shows a publication notification screenshot of the mobile app in accordance with an embodiment of the present disclosure.

FIG. 13 shows an example user editing screenshot 1300 where the user can edit a Mixed-Media Module 1305. The user can, for example, change the Mixed-Media Module's filter, edit moments, add a song and set the pace of the slideshow. The pace may be set inline via a slider. In one embodiment, the user can set the title of a Mixed-Media Module 275. The user can edit specific moments by adding media and captions. In one embodiment, the user can add additional moments, can provide a description, and/or can share the Mixed-Media Module before publishing it. In one embodiment, the location can be changed and/or friends can be tagged. The Mixed Media Module 275 can be shared or posted to a social media site. In one embodiment, the user can trim or crop videos or photos (e.g., via the standard iOS interface). In one embodiment, the user can add a song from their library or by searching iTunes®. The user can trim the song (e.g., via a draggable slider). The user can tag users, and/or can select a location of the media item or Mixed Medi Module 275.

In one embodiment, the mobile app 150 shows a map indicating where the app 150 drew the media from to create the Mixed-Media Module 275. For example, the geographic locations can be shown on the map with indicators identifying the number of media items that relate to a specific location.

In one embodiment, the mobile app 150 enables social, online interaction. For example, the user may have a profile, can follow others, and can be followed by others. Further, in one embodiment, the user's Mixed Media Modules can be "liked" and other users (or the user) can provide comments (e.g., on, about, or related to the Module). The mobile app 150 can allow for collaboration with social media contacts and friends to share and publish captured media at events to create shared videos that tell stories in the form of the Mixed-Media Modules 275. Users can collaborate, create and share Mixed-Media Modules 275 both before an event and after an event all on their mobile device 105.

The ability to share captured multimedia and create Mixed-Media Modules 275 with friends can be done during an event and after the event, gradually building up to the peak experience that it can be shared with friends. For example, one or more of the following steps can be performed (See, e.g., FIGS. 14-20):

1. The owner or administrator of a presentation associated with a desired activity or event can send an invitation to join in creating a Mixed-Media Module 275 to their friends. This can be done a number of ways. Some of these include sending an invitation via social media websites, such as Facebook®, Twitter®, email, or SMS to have another person download the mobile app 150, if they do not already have it on their mobile device. This enables the individual to, during the event, capture media on their mobile device to be shared and integrated automatically or manually into Mixed-Media Modules 275. This can be done on a Create home page (e.g., screenshot 1400 of FIG. 14) on the mobile app 150 where there are options on the screen to create a Mixed-Media Module "From my Camera Roll", "With Friends", "With All", or from other sources, for example.

2. With the "From my Camera Roll" option, the mobile app 150 allows the creator to begin adding media from their camera roll on their mobile device 105 to begin the creation of the Mixed-Media Module 275. The "With Friends" option invites the user's friends (from the app), or can also integrate with other friend lists from various sources, such as social media applications including but not limited to Facebook®, Twitter®, and Instagram® (See, e.g., screenshot 1500 of FIG. 15).

3. The "With All" option allows creation of a Mixed-Media Module 275 as a public event for open collaboration with the community. This can enable a mobile app user to connect with others using the app 150 at an event and share their media collectively to create a Mixed-Media Module 275.

4. The user attends the event and announces their arrival through the mobile app 150 or through invitations, and/or sending off notifications for others to join. The user is also able to see other users that are in proximity to them through geo-location, and they are able to invite others to join through this channel as well. If the owner of the Mixed-Media Module 275 chooses to create with friends, in the next screen, they select friends (simply searching their friend list on the app/phone book/Facebook®/other sources (for example), and send invites such as the invite screenshot 1500 shown in FIG. 15. In one embodiment, the user waits for friends to contribute.

5. The friend or mobile app user can receive an invitation via a notification or alert on their device (See, e.g., screenshot 1600 of FIG. 16).

6. If the owner or administrator of a Mixed-Media Module chooses to create a public event for open collaboration they would choose the "Create With All" option (See, e.g., screenshot 1700 of FIG. 17). On this screen, they can, e.g., pick a hash tag to label the event and, in this case, can add users to the public event. Once a user's friends are notified who is at the event and is in the group granted access to contribute to the Mixed-Media Module 275, they can opt in and begin sharing their captured media to be made into implementations of Mixed-Media Modules 275 (See, e.g., screenshot 1800 of FIG. 18).

7. At this point the user that was invited and has opted into the particular Mixed-Media Module 275 can begin sharing uploads of their media, and this subsequently allows the owner of the event (who originally invited this user) to see their added media in the screen.

8. Again, users have a choice of which multimedia they share with the group creating the Mixed-Media Module 275 and can choose to create independent Mixed-Media Modules 275 on their own from the shared multimedia. This can all be done in real-time and Mixed-Media Modules 275 can be created during an event and can added to until there is a finished Mixed-Media Module 275 at the end of an event (See, e.g., screenshot 1900 of FIG. 19).

9. During and after the event, the Mixed-Media Module 275 can be previewed and edited. When the owner or administrator of the Mixed-Media Module 275 is ready, they can "end" the event and all of the submitted media can then be clustered and output into the Mixed-Media Module format.

10. Users can then edit and publish the Mixed-Media Module of the event, with the contributors credited.

11. There are also notifications that alert users who have contributed to a Mixed-Media Module to view it. In one embodiment, this is a standard system notification the user can receive outside of the app on their mobile device (See, e.g., screenshot 2000 of FIG. 20).

In one embodiment, a user opens the mobile app 150 and is presented with a default list of media presentations (Qwikis) that are currently popular or from the profiles of other users they follow. The user scrolls through the Qwikis which are presented (e.g., as individual thumbnails) to read the titles, preview, and, as they pause on a thumbnail with their finger while scrolling down, the associated data animates out and they can watch the Qwiki, comment on it, see who else has commented, share it, and see the soundtrack. It's a highly efficient way to share a feed of videos and preview videos without having to watch one. By not opening each multi-media presentation, this preserves data bandwidth and becomes a more efficient way of viewing.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among software applications at either the user computing device or server or both. In this regard, any number of the features of the different embodiments described herein may be combined into single or multiple embodiments, and alternate embodiments having fewer than, or more than, all of the features described herein are possible. Functionality may also be, in whole or in part, distributed among multiple components, in manners now known or to become known. Thus, myriad software/hardware/firmware combinations are possible in achieving the functions, features, interfaces and preferences described herein. Moreover, the scope of the present disclosure covers conventionally known manners for carrying out the described features and functions and interfaces, as well as those variations and modifications that may be made to the hardware or software or firmware components described herein as would be understood by those skilled in the art now and hereafter.

While the system and method have been described in terms of one or more embodiments, it is to be understood that the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A method comprising:
analyzing, by a processor of a computing device, a first set of media items associated with a user, each media item having associated metadata;
identifying, by the processor, based on analysis of the associated metadata in the first set, one or more related characteristics among the media items in the first set, said characteristics corresponding to a time period and a type of content depicted within the media items;
forming, by the processor, a cluster of media items associated with an event based on the identified one or more related characteristics, each media item in said cluster comprising said type of content associated with said time period;
repeating, by the processor, the analyzing step and the identifying step for a second set of media items, each media item in the second set having associated metadata, each media item in said second set being identified based on a social connection of the user in a social media site;
adding, by the processor, one or more media items from the second set to the cluster of media items, said added media items comprising said one or more related characteristics that formed the basis for said formation of the cluster;

analyzing, by the processor, a plurality of templates within a template database based on criteria defined by the one or more characteristics, and based on said analysis, identifying a set of templates that have characteristics matching the one or more characteristics, said template characteristics further comprising information indicating time criteria for identifying a time within content of a media item associated with said event;

selecting, by the processor, said set of templates;

editing, by the processor, each media item in said cluster based on said selected templates, said editing comprising organizing said media items in said cluster according to said time of said event based on a time period indicated by of each media item's characteristics; and creating, by the processor, a mixed-media module comprising said edited media item cluster.

2. The method of claim 1, further comprising analyzing, by the processor, the associated metadata of each media item in the first set.

3. The method of claim 1, further comprising analyzing, by the processor, the associated metadata of each media item in the second set.

4. The method of claim 1, further comprising analyzing, by the processor, the media items in the cluster.

5. The method of claim 4, further comprising selecting, by the processor and based on the analysis of the media items in the cluster, a plurality of templates from a template database.

6. The method of claim 1, further comprising determining, by the processor, the desired sequence for the selected templates.

7. The method of claim 1, wherein the social connection further comprises one or more of a friend, follower, contact, and connection in the social media site.

8. The method of claim 1, further comprising sharing, by the processor, the mixed-media module with a second social connection on the social media site.

9. The method of claim 1, further comprising communicating, by the processor, a notification to a second computing device, the notification relating to the mixed-media module.

10. The method of claim 1, wherein the creating further comprises enabling the user and a social media site social connection of the user to create the mixed-media module.

11. The method of claim 1, further comprising:
obtaining, by the processor, the media items in the cluster from the computing device; and
obtaining, by the processor from the social media site associated with the second set, the one or more media items in the second set having the one or more related characteristics.

12. A computing device comprising:
a processor; and
a non-transitory computer-readable storage medium for tangibly storing thereon program logic for execution by the processor, the program logic comprising:
analyzing logic executed by the processor for analyzing a first set of media items associated with a user, each media item having associated metadata;
identifying logic executed by the processor for identifying, based on analysis of the associated metadata in the first set, one or more related characteristics among the media items in the first set, said characteristics corresponding to a time period and a type of content depicted within the media items;
forming logic executed by the processor for forming a cluster of media items associated with an event based on the identified one or more related characteristics, each media item in said cluster comprising said type of content associated with said time period;
performing logic executed by the processor for performing the analyzing logic and the identifying logic for a second set of media items, each media item in the second set having associated metadata, each media item in said second set being identified based on a social connection of the user in a social media site;
adding logic executed by the processor for adding, one or more media items from the second set to the cluster of media items, said added media items comprising said one or more related characteristics that formed the basis for said formation of the cluster;
analysis logic executed by the processor for analyzing a plurality of templates within a template database based on criteria defined by the one or more characteristics, and based on said analysis, identifying a set of templates that have characteristics matching the one or more characteristics, said template characteristics further comprising information indicating time criteria for identifying a time within content of a media item associated with said event;
selecting logic executed by the processor for selecting said set of templates;
editing logic executed by the processor for editing, each media item in said cluster based on said selected templates, said editing comprising organizing said media items in said cluster according to said time of said event based on a time period indicated by of each media item's characteristics; and
creating logic executed by the processor for creating a mixed-media module comprising said edited media item cluster.

13. The computing device of claim 12, further comprising second analyzing logic executed by the processor for analyzing the associated metadata of each media item in the first set.

14. The computing device of claim 12, further comprising second analyzing logic executed by the processor for analyzing the associated metadata of each media item in the second set.

15. The computing device of claim 12, further comprising second analyzing logic executed by the processor for analyzing the media items in the cluster.

16. The computing device of claim 15, further comprising selecting logic executed by the processor for selecting, based on the analysis of the media items in the cluster, a plurality of templates from a template database.

17. The computing device of claim 12, further comprising determining logic executed by the processor for determining the desired sequence for the selected templates.

18. The computing device of claim 12, wherein the social connection further comprises one or more of a friend, follower, contact, and connection in the social media site.

19. The computing device of claim 12, further comprising sharing logic executed by the processor for sharing the mixed-media module with a second social connection on the social media site.

20. The computing device of claim 12, further comprising:
   obtaining logic executed by the processor for obtaining the media items in the cluster from the computing device; and
   social media site obtaining logic executed by the processor for obtaining, from the social media site associated with the second set, the one or more media items in the second set having the one or more related characteristics.

21. A non-transitory computer readable storage medium tangibly storing thereon computer program instructions, that when executed by a processor of a computing device, perform a method comprising:
   analyzing, by the processor, a first set of media items associated with a user, each media item having associated metadata;
   identifying, by the processor, based on analysis of the associated metadata in the first set, one or more related characteristics among the media items in the first set, said characteristics corresponding to a time period and a type of content depicted within the media items;
   forming, by the processor, a cluster of media items associated with an event based on the identified one or more related characteristics, each media item in said cluster comprising said type of content associated with said time period;
   repeating, by the processor, the analyzing step and the identifying step for a second set of media items, each media item in the second set having associated metadata, each media item in said second set being identified based on a social connection of the user in a social media site;
   adding, by the processor, one or more media items from the second set to the cluster of media items, said added media items comprising said one or more related characteristics that formed the basis for said formation of the cluster;
   analyzing, by the processor, a plurality of templates within a template database based on criteria defined by the one or more characteristics, and based on said analysis, identifying a set of templates that have characteristics matching the one or more characteristics, said template characteristics further comprising information indicating time criteria for identifying a time within content of a media item associated with said event;
   selecting, by the processor, said set of templates;
   editing, by the processor, each media item in said cluster based on said selected templates, said editing comprising organizing said media items in said cluster according to said time of said event based on a time period indicated by of each media item's characteristics; and
   creating, by the processor, a mixed-media module comprising said edited media item cluster.

* * * * *